United States Patent [19]

Thorson

[11] 4,440,986

[45] Apr. 3, 1984

[54] MICROPROCESSOR CONTROLLER FOR SIMULTANEOUSLY CONTROLLING A PBX AND PROVIDING MULTIPLE USER ACCESS FOR GENERAL PURPOSE DATA PROCESSING

[75] Inventor: John T. Thorson, Oak Forest, Ill.

[73] Assignee: Walter L. Douglas, Hickory Hills, Ill.

[21] Appl. No.: 200,965

[22] Filed: Oct. 27, 1980

Related U.S. Application Data

[63] Continuation-in-part of Ser. No. 13,617, Feb. 21, 1979, abandoned.

[51] Int. Cl.³ .................. H04M 11/00; H04Q 3/54
[52] U.S. Cl. .................. 179/2 DP; 179/18 AD; 179/18 ES; 370/85
[58] Field of Search .......... 179/2 DP, 18 ES, 18 AD, 179/2 CA; 370/85, 62, 66, 79, 80, 91; 340/152 R, 154, 825.27, 870.01; 364/200, 900

[56] References Cited

U.S. PATENT DOCUMENTS

| B 533,454 | 3/1976 | Moran .................................. 364/200 |
| 3,344,401 | 9/1967 | MacDonald et al. ....... 179/2 DP X |
| 3,898,387 | 8/1975 | Fort ........................................ 370/80 |
| 3,932,709 | 1/1976 | Hoff et al. ......................... 179/90 K |
| 4,069,399 | 1/1978 | Barrett et al. ..................... 370/62 X |
| 4,093,823 | 6/1978 | Chu ....................................... 370/92 |
| 4,160,131 | 7/1979 | Kaul et al. ........................ 179/99 M |

FOREIGN PATENT DOCUMENTS

| 2243580 | 3/1974 | Fed. Rep. of Germany ........ 370/62 |
| 2644404 | 12/1977 | Fed. Rep. of Germany ........ 179/18 AD |
| 2647404 | 12/1977 | Fed. Rep. of Germany ........ 179/18 AD |

OTHER PUBLICATIONS

"Microprocessors in Telecommunications", Garen & LaZar, *Telecommunications*, Apr. 1976, pp. 43–48.
"System 2150–For Computer Assisted PABX Service", by E. H. Shoobridge, International Conference on Communications Equipment and Systems, Brighton, England, Jun. 1976, pp. 245–248.
"Designing a Microprocessor Driven Multipurpose Peripheral Controller", Richard F. Binder, *Computer Design*, Apr. 1979, pp. 83–91.
"Multifunction Equipment", Ely S. Lurin *Telecommunications*, Oct. 1979, pp. 79–82.

*Primary Examiner*—Thomas W. Brown
*Attorney, Agent, or Firm*—Rogers, Eilers & Howell

[57] ABSTRACT

A microprocessor controller has a central processor, including a microprocessor, to centrally control a PBX and also provide general processor capability to a plurality of data terminals. Any typical centrally controlled PBX design which processes and switches telephone calls between a plurality of trunk ports and a plurality of line ports, as is known in the art, may be connected to applicant's controller with the program control for same loaded into a dedicated PBX memory of the microprocessor controller. A supervisory program controls the microprocessor's processing time by dividing it into slices which are allocated to the various data ports and the PBX portion, with provision for interrupting and aborting time slots not calling for processor time to ensure efficient and reliable operation of the PBX. Each of up to six data ports is allocated a partition of memory and access to other partitions is denied to preserve the integrity and confidentiality of data and programs stored by each data port. A command terminal connection is provided and the supervisory program allows the command terminal to access all of the processor's memory, including the partitioned data port memory and the PBX memory, so that changes and monitoring of processor use may be made by a limited group of personnel having access thereto. The command terminal also provides ready access for troubleshooting of equipment failure in any portion of the controller.

25 Claims, 19 Drawing Figures

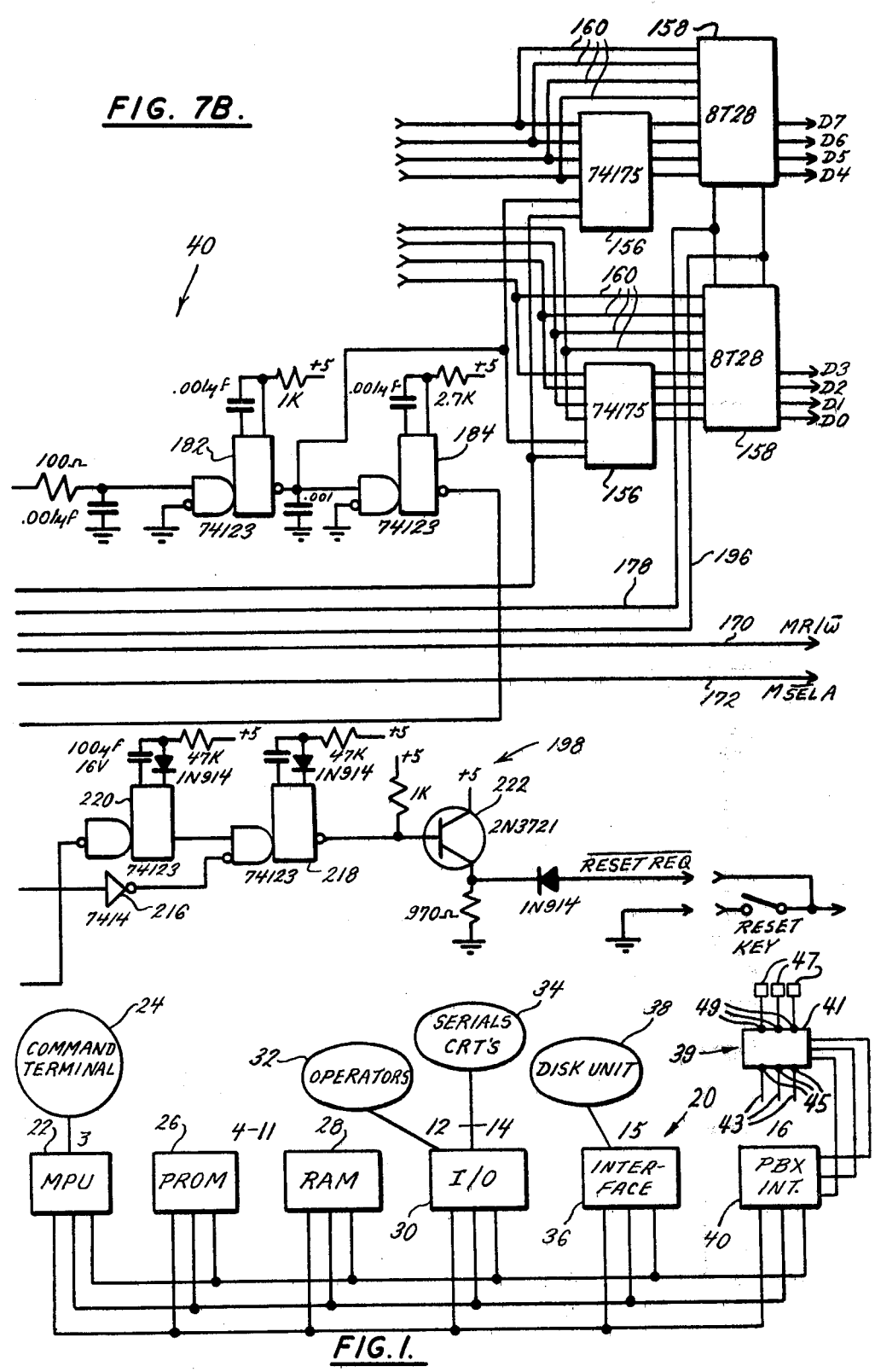

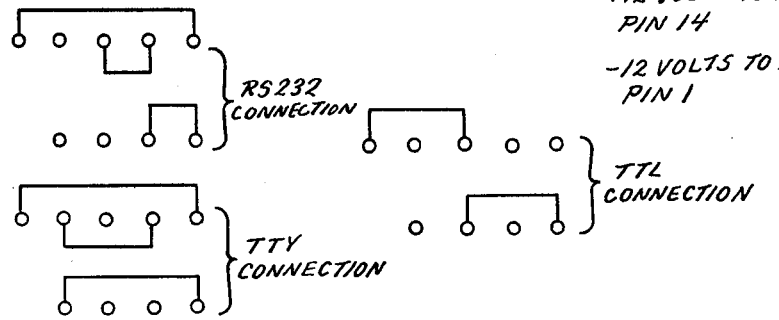
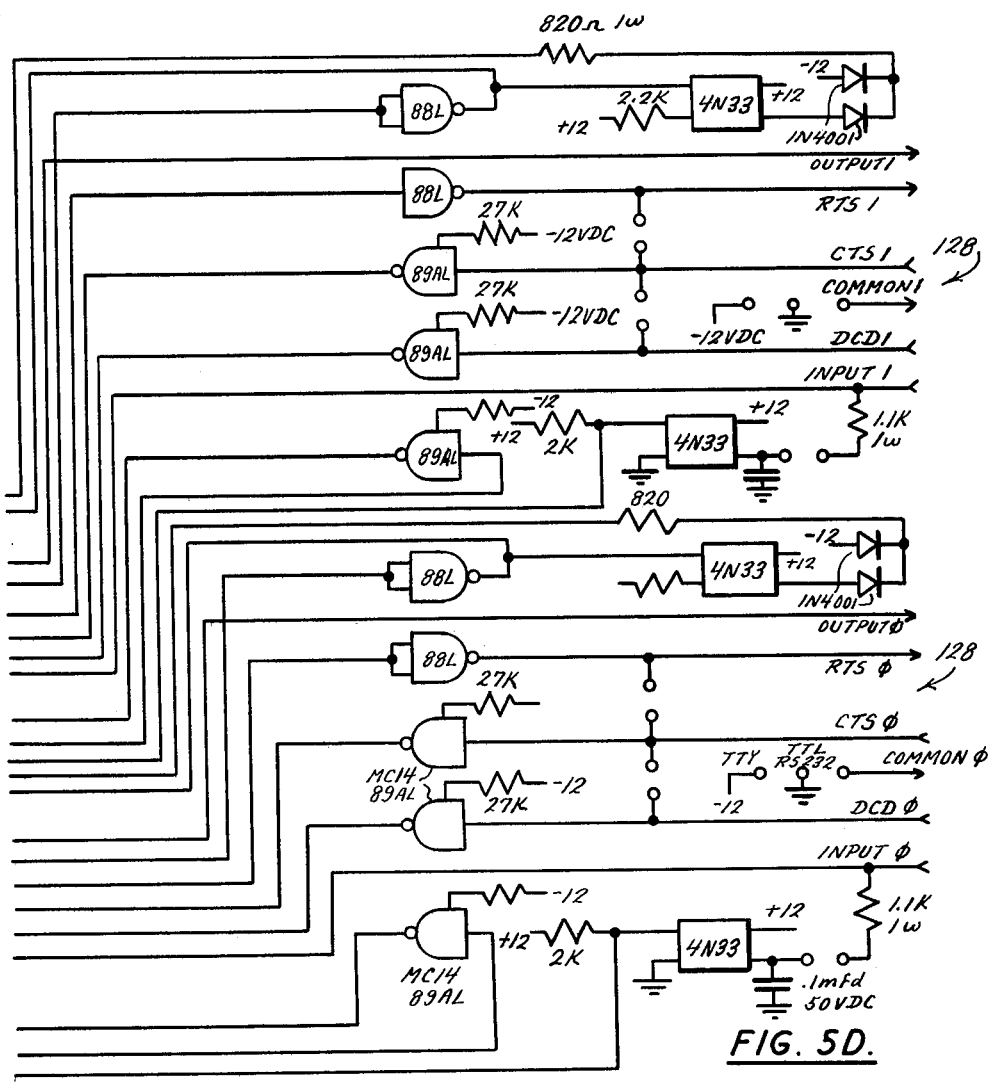
FIG. 5D.

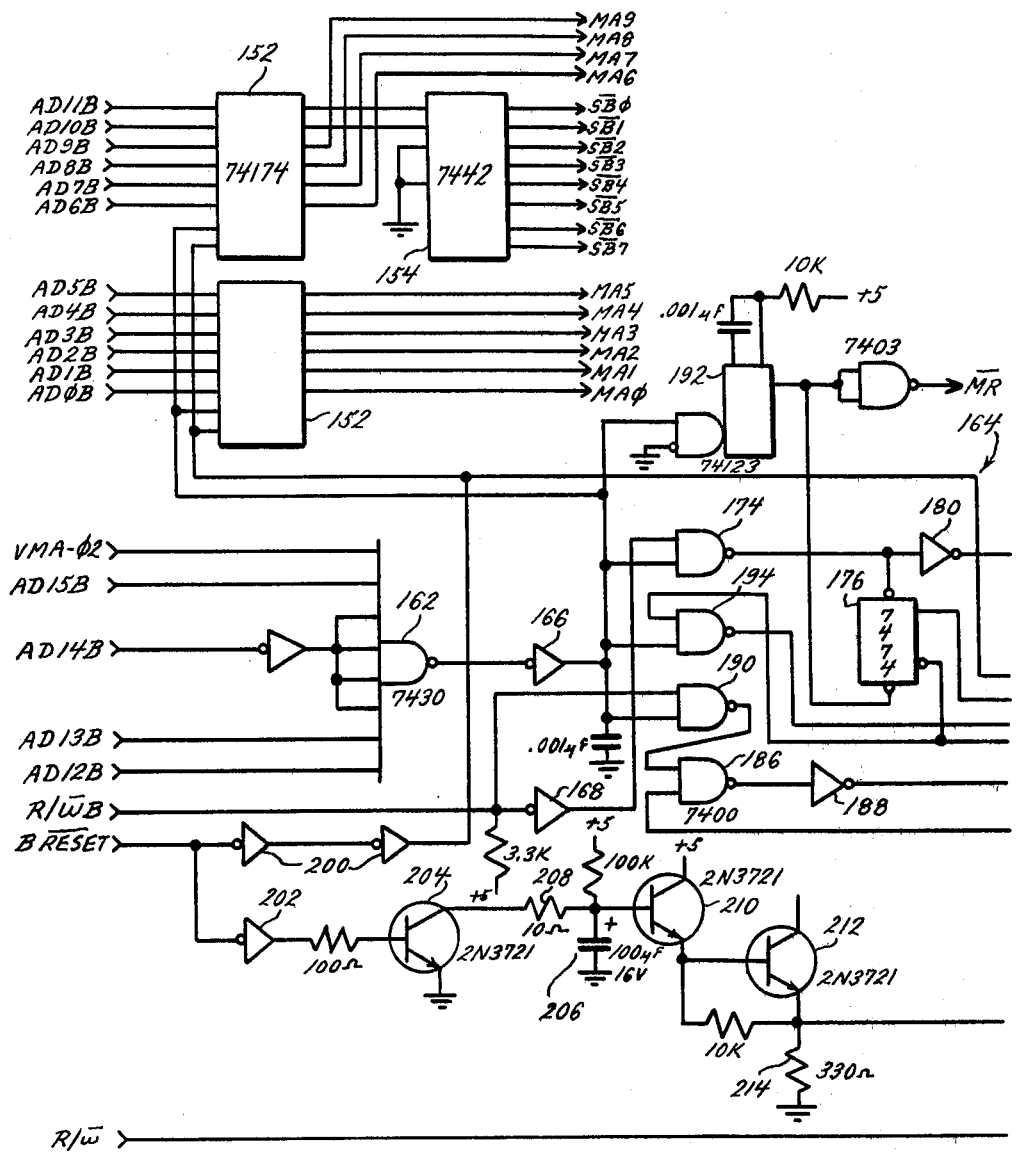
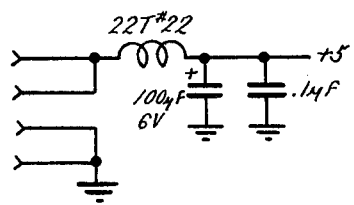
FIG. 7A.

MICROPROCESSOR CONTROLLER FOR SIMULTANEOUSLY CONTROLLING A PBX AND PROVIDING MULTIPLE USER ACCESS FOR GENERAL PURPOSE DATA PROCESSING

BACKGROUND AND SUMMARY

This application is a continuation-in-part of applicant's parent application, Ser. No. 013,617, filed Feb. 21, 1979, now abandoned.

There has been rapid change and innovation in the design of private automatic branch exchanges (PABX, PBX) and this has been partially caused by the virtually exploding technology in the art of electronic components. Since the first electronic switching PBX, practically every new development in the art of electronic components lends itself to a new design for an electronic PBX. However, there is always some delay between the introduction of a new electronic device and its used in a PBX because of its relatively high cost when it is first manufactured, as well as the design time required to incorporate the new device into a PBX design. As a PBX manufacturer generally has an existing design, new electronic technology is not always used to its best advantage but instead is merely substituted for an existing circuit which takes some advantage of it without going through a complete redesign. Hence, many PBXs have evolved which incorporate successive levels of new technology but which are locked into an old approach to solving the problem of telephone communication switching and which therefore make poor use of the power and capability of new electronic technology.

To take full advantage of the power and capability of medium scale and large scale integration it is necessary to group logic and memory functions so that a single chip might be used in the place of individual components. This led to a trend in designs having distributed logic and memories at each port of a PBX and some sort of central logic which is accessed as called for by the port logic and memory. This minimizes the complexity of central logic which was in keeping with the state of the art in medium scale and large scale integration type logic devices. It has only been recently with the development of the microprocessor that it has become economically feasible to concentrate all the logic and memory for the processing of telephone communications into a central processor. These computer controlled branch exchanges (CBX) are known in the art. However, with a central processor consisting of a microprocessor a much greater effort is required to develop a software package than is required with the distributed memory tape of PBX. This software effort adds significantly to the already higher cost of a new hardware design for a CBX, and while the customer may be provided with extra features and benefits, it is generally considered that the distributed memory tape PBX provides adequate features at a significant cost savings. Thus, the CBX has met with only limited acceptance.

Concurrently with the sophisticiation of the PBX, the general public has grown to accept the concept of personalized and individualized computers for use both in small businesses and in the home. This general acceptance of the computer has led to the ever expanding market of business applications for the computer. Every year, smaller and smaller businesses are finding that they can economically take advantage of a computer in operating their business. Various tasks such as accounting, payroll, inventory control, routing of shipments, sales reporting, intermediate profit and loss statements, cost controls, etc. are efficiently and quickly handled by a computer. In addition, once a business starts using a computer, it soon finds that its needs for processing capability rapidly increase as its managers learn new and better ways to utilize the powers of the computer to aid them in making management decisions. What is at first considered a luxury soon becomes a necessity to successfully compete against competitors who also have the advantage of a computer.

I have succeeded in inventing a microprocessor controller which is a radical departure from the distributed memory type of design, and which solves the cost problem experienced in CBX equipment by providing a general purpose computer to the businessman. Indeed, my microprocessor controller generally represents a substantial savings over the combined cost of a separate PBX or CBX and a mini or micro computer system with software support. This increased capability can be provided in the same physical equipment size as a CBX or PBX and installed in the same telephone equipment room. The customer then need only add peripheral equipment to access the microprocessor. A unique programming technique provides both a PBX program and a supervisory program to service a plurality of input-/output terminals on a time sharing basis with program controls to ensure satisfactory operation of the PBX equipment, even under the heaviest traffic patterns.

In my preferred embodiment, up to six external users may access the central processor on a time sharing basis at the same time and the supervisory program provides the necessary control to ensure that the PBX operation is not significantly impaired and that switching of lines or trunks is not unduly delayed. The supervisory program partitions the memory and limits the access each data port has to the processor's memory so that, for example, the engineering department would not have access to the payroll records which may be in another partition of memory specifically assigned to the accounting department data port. This preserves the confidentiality of program information and data files to deter computer theft. Also, this eliminates the possibility of an external user accessing the PBX program and inadvertently interrupting the PBX operation, or even erasing portions of the PBX program.

A command terminal is provided which has unlimited access to both the PBX portion and the external user partitions of memory so that changes and modifications may be made to the PBX program (such as for class of service changes) and the activities of each of the data ports can be monitored. The control allowed the command terminal is dependent upon the particular software controls employed. The command terminal may be used to terminate programs that are being processed, erase programs in the library of any particular data port, modify any partition memory including deleting data files, and deny access to off-line memory granted to a data port by the supervisory program, i.e. such as in a floppy disc. In my preferred embodiment, the command terminal must be attached to a connector inside the equipment cabinet. Access to the command terminal may then be limited by physically locking the telephone equipment room or by locking the machine hardware cabinet closed. However, the command terminal may be programmed for any other data port to suit the needs of the particular installation.

In the preferred embodiment, space is provided for increasing the memory size by the addition of up to eight printed circuit boards, each of which can accommodate either 16K of PROM or 4K of RAM memory. This additional memory capacity is beyond the 8K of PROM and 1K of RAM memory provided on the microprocessing unit printed circuit board of MPU board which includes the microprocessor. The amount of extra memory that can be accommodated is dependent upon the addressing capability of the microprocessor and as the size and power of microprocessors increase in the future, it is anticipated that memory packages will be provided having greater densities which can be utilized. In addition, various addressing schemes can be used, i.e. such as paging, or the use of folded memory to increase the size of available memory for each partition assigned to a data port and thereby significantly increase the programming capability.

An assembly language, such as BASIC, may be provided in a commonly accessible memory location and a repertoire of sub-routines may be programmed into the supervisory program to increase the programming power. In order to ensure complete partitioning, it may be desirable to dump the assembly language into the partitioned memory when called for before a data port is permitted to begin programming. This would increase the memory requirements and an addressing scheme such as mentioned above could be used along with higher density memories.

Thus, my invention of a stored program controlled microprocessor controller provides a central program control for a PBX and also provides a general purpose computer which is accessible on a time sharing basis by a plurality of data ports, all in an economically priced package which is ideally suited to the small business. These and other advantages are more fully explained in the drawings and description of the preferred embodiment.

BRIEF DESCRIPTION OF THE DRAWINGS

FIG. 1 depicts the system block diagram;

FIGS. 5A–5D depict a serial interface input/output printed circuit board with four data ports;

FIGS. 7A–7B depict a PBX interface printed circuit board with buffering and signal conditioning to interface the microprocessor controller with a typical PBX;

DESCRIPTION OF THE PREFERRED EMBODIMENT

Figure 2A:
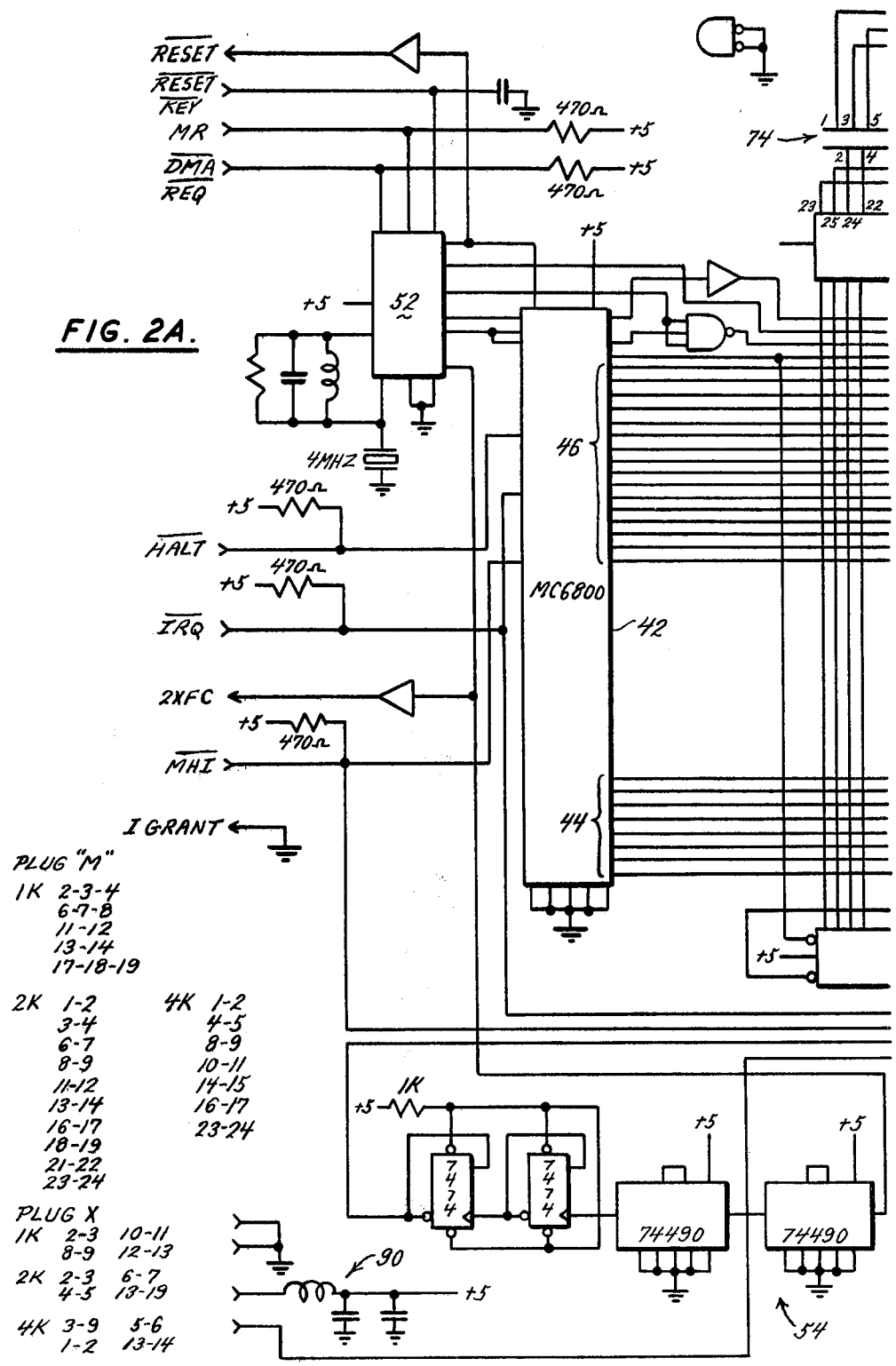
FIGS. 2A–2C depict the MPU printed circuit board including the microprocessor and memory.

As shown in FIG. 1, my microprocessor controller 20 is particularly suited to modular construction, and each element in the system may be mounted on a printed circuit board and the entire system rack mounted in a shelf in the same equipment rack as any typical electronic PBX 39. Each shelf may be designed to accept a common number of printed circuit boards, such as 17, and each element of the system may be assigned to one or more slots in the shelf. For instance, slot 1 may be assigned to a ring generator PBX board (not shown) which would generate a ring signal or busy signal to the line ports as controlled by the microprocessor controller 20. A second board slot may be assigned to a paging printed circuit board (not shown) which would provide the necessary addressing logic to expand the memory addressable by the controller 20. The third board slot may be assigned to the microprocessing unit (MPU) printed circuit board 22. The command terminal 24 is shown as directly accessing the MPU board 22 for security purposes. However, the command terminal 24 may be connected to any input/output data port if the software addressing is adjusted accordingly. An example of a typical device suitable for use as a command terminal is Catalog No. D-311 manufactured by Informer, Inc., although other devices could be used as well, as is known in the art. Slots 4–11 may be assigned for additional memory in the form of either 16K PROM printed circuit boards 26 or 4K RAM printed circuit boards 28. In my preferred embodiment, seven 4K RAM boards and one 16K PROM board are provided. I disclose and describe these particular configurations although other configurations are possible and would be limited only by the available technology and the addressing capabilities of the central processor. Slots 12, 13 and 14 may be assigned to serial input/output data PC boards 30. As shown, operator consoles 32 which serve as the main control for the PBX and various peripheral input devices 34 may be selectively connected to these input/output data boards 30. Slot 15 may be assigned to an interface PC board 36. As shown, a disc memory unit 38 may be connected to interface PC board 36 and provides an expanded moderate speed memory which may be partitioned for each of the peripheral input devices 34. Also, the interface PC board 36 may provide driving connection to various peripheral devices required for PBX operation. A PBX interface PC board 40 may be assigned to slot 16 and provide the necessary buffering and signal conditioning of command signals for interconnection to an extended bus way in a centrally controlled PBX. As is known in the art, a PBX 39 includes a switching network 41 for selectively connecting a plurality of trunk lines 43 connected to the network 41 at a plurality of trunk ports 45, to a plurality of telephone extensions 47 connected to a plurality of line ports 49. Slot 17 may be assigned to a common timing and buffering board (not shown) to generate timing signals logic decode for PAM or PCM operation and also provide another layer of buffering between the extended bus way and the microprocessor controller 20 which controls the PBX.

As disclosed, the microprocessor controller may consist of a plurality of printed circuit boards, each of which performs a specified function and all of which are mounted in a shelf with specific slots assigned for interconnection. This modular shelf of PC boards can be easily rack mounted on an existing PBX or provided as part of a centrally controlled PBX all within the same cabinet. As is further described below, my controller includes sufficient interfacing and protection of its circuits to permit its use with any PBX setup for central computer control where the address and data bits of information are distributed throughout the system to control both trunk ports for incoming Bell Telephone Company trunk lines and line ports for connection to telephone sets distributed throughout the particular installation. The features and options and method of controlling the PBX switching is selected through software, and my controller is adapted to be operated with almost any imaginable software package for controlling a PBX using various kinds of telecommunication techniques including PAM, PCM, and others.

I will now describe in further detail each of the modular elements of his system. Each modular element corresponds to a PC board and typical electronic component type members are shown in the drawings, although equivalent devices may be used.

MPU Board

Figure 2B:
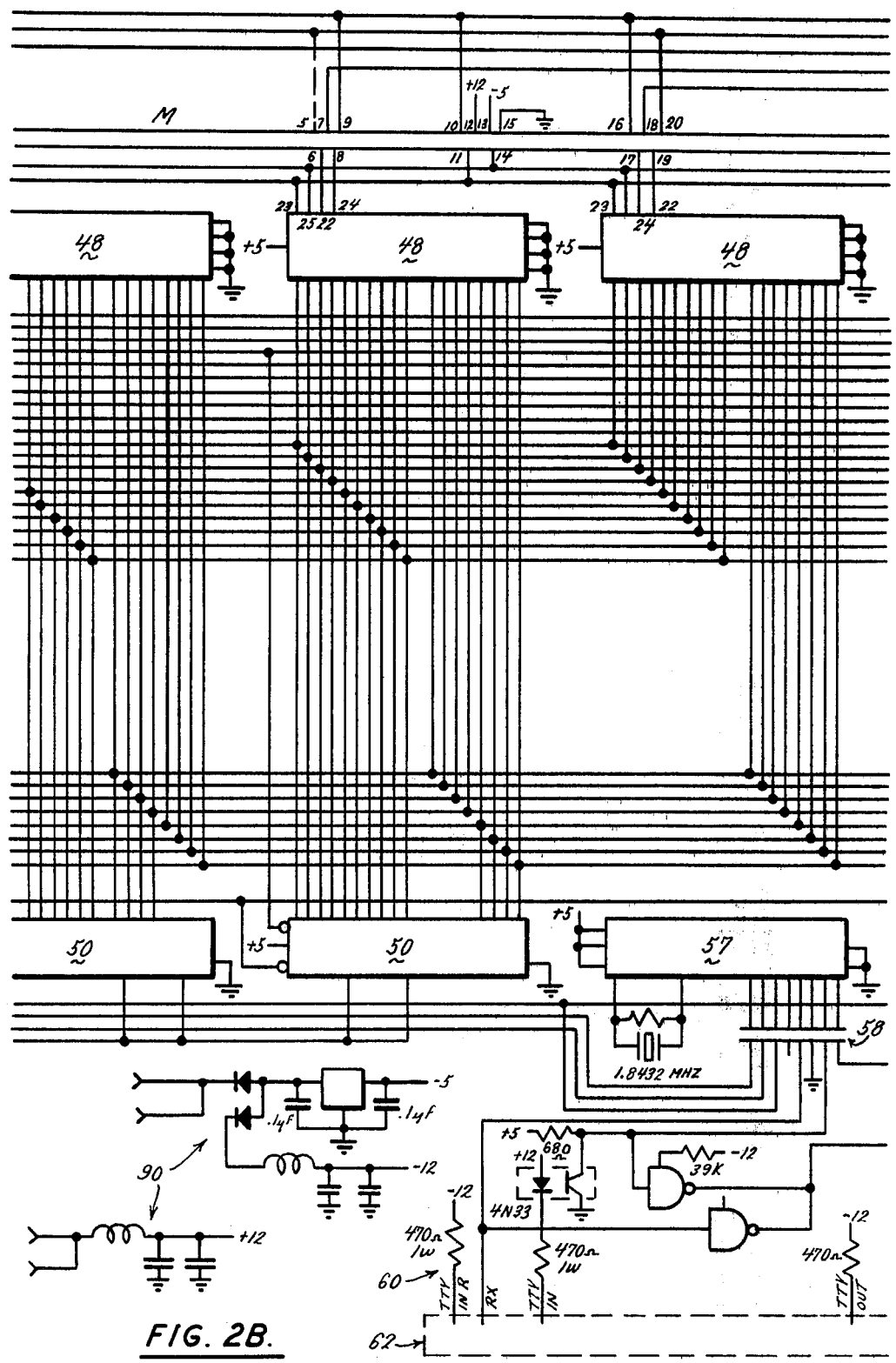
Figure 2C:
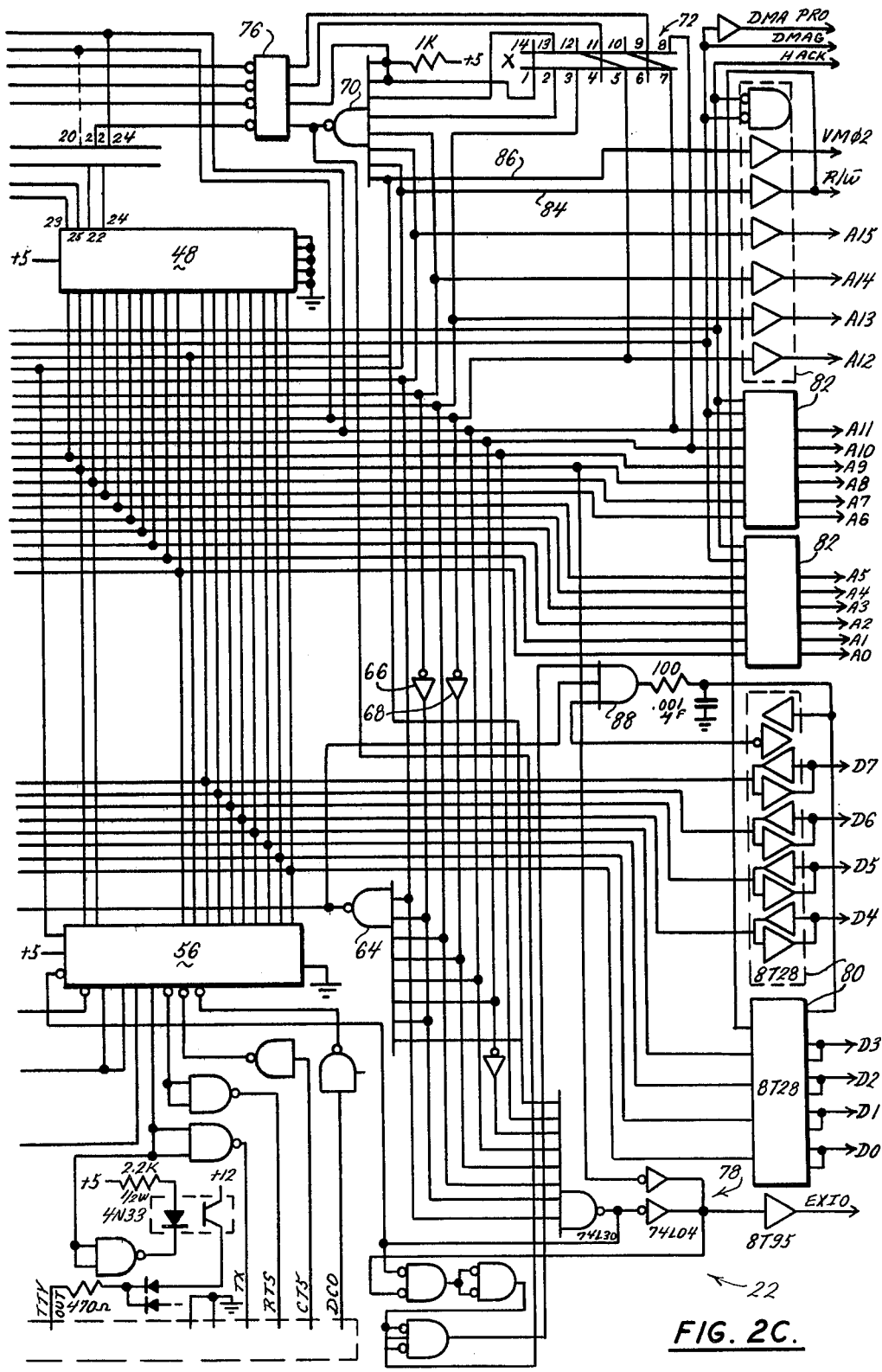

As shown in FIGS. 2A–C, the MPU printed circuit board includes a microprocessor 42, such as a Motorola™ MC6800, with an eight bit data bus 44 and a sixteen bit address bus 46. A total of four 2K PROM memories 48 and a pair of 1K by four bit RAM memories 50 are mounted to the board and provide a base memory. A two megahertz clock 52 and a twenty millisecond timing circuit 54 provide timing pulses for use by microprocessor 42. A serial input/output port 56 may be strapped to baud rate generator 57 through option strap 58 and standard input circuitry 60 extends between port 56 and strap connector 62 to provide a connection point for the command terminal 24. Input circuitry 60 as is known in the art and option strap 62 may be jumpered as appropriate to select a baud rate for the type of data source used as the command terminal 24. Input circuitry 60 will accommodate data from either a TTY, or RS232 data source.

An address decoder 64 along with inverters 66 and 68 provide a control signal to access the 4K RAMs 50. Similarly, an address decoder 70 provides a control signal for the 2K PROM memories 48. An option strap 72, option strap 74, and decoder 76 provide multiple connections to accommodate the address decoding for different sized PROM memories. A third address decoder 78 develops the EXIO control signal to preselect a portion of memory and minimize the number of address bits which must be distributed to other printed circuit boards in the controller. A bi-directional buffer 80 is provided in the data bus 44 and acts as a termination point on the MPU PC board 22. Similarly, a unidirectional buffer 82 is provided as a termination point for the address bus 46 as well as the bus 84 distributing the r/$\overline{w}$ signal and the VMA $\phi$2 bus 86. Both buffers 80 and 82 may be inhibited to prevent spurious signals from passing therethrough. The incoming portion of the data buffer 80 is inhibited by an inhibit receive circuit 88 which is activated whenever microprocessor 42 reads from a PROM 48 or RAM 50 memory located on the MPU boards 22. Data buffer 80 is inhibited in the write direction whenever the microprocessor 42 reads, causing r/$\overline{w}$ to go high. Address buffer 82 is inhibited whenever the microprocessor 42 is cycled off as in a DMA grant mode. Also included are several power supplies 90 to provide voltage sources, as required. Other connections are provided as shown and labeled as would be apparent to one of ordinary skill in the art.

16K PROM Board

Figure 3A:
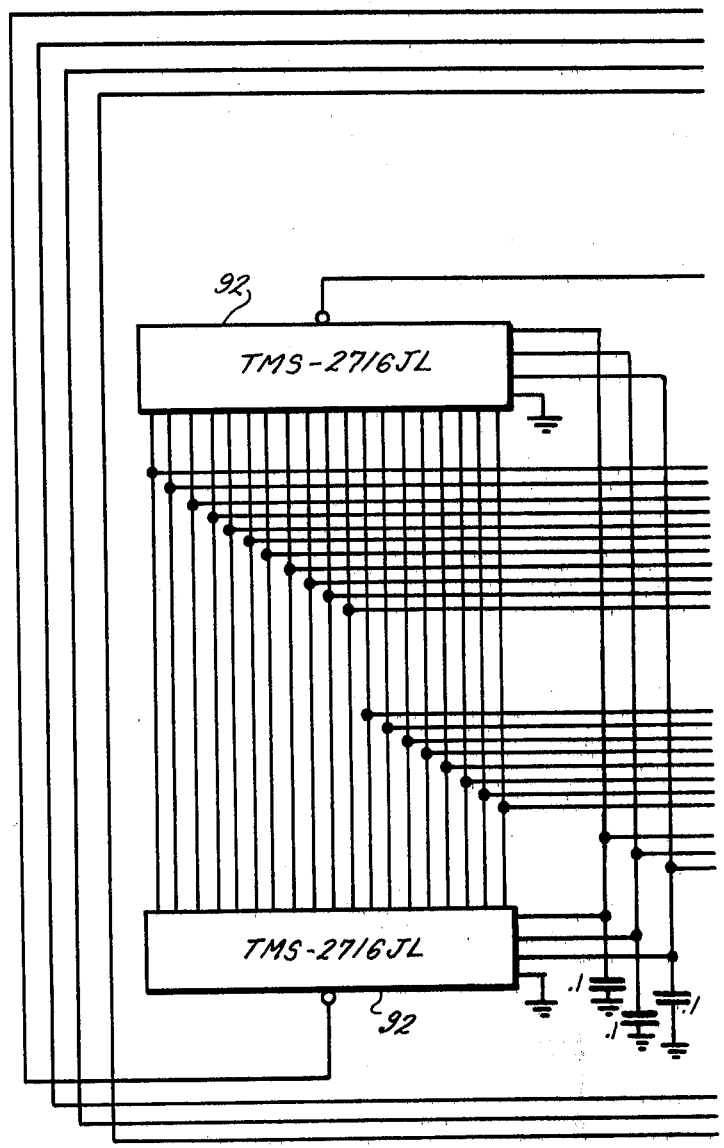
FIGS. 3A–3C depict a 16K PROM printed circuit board.
Figure 3B:
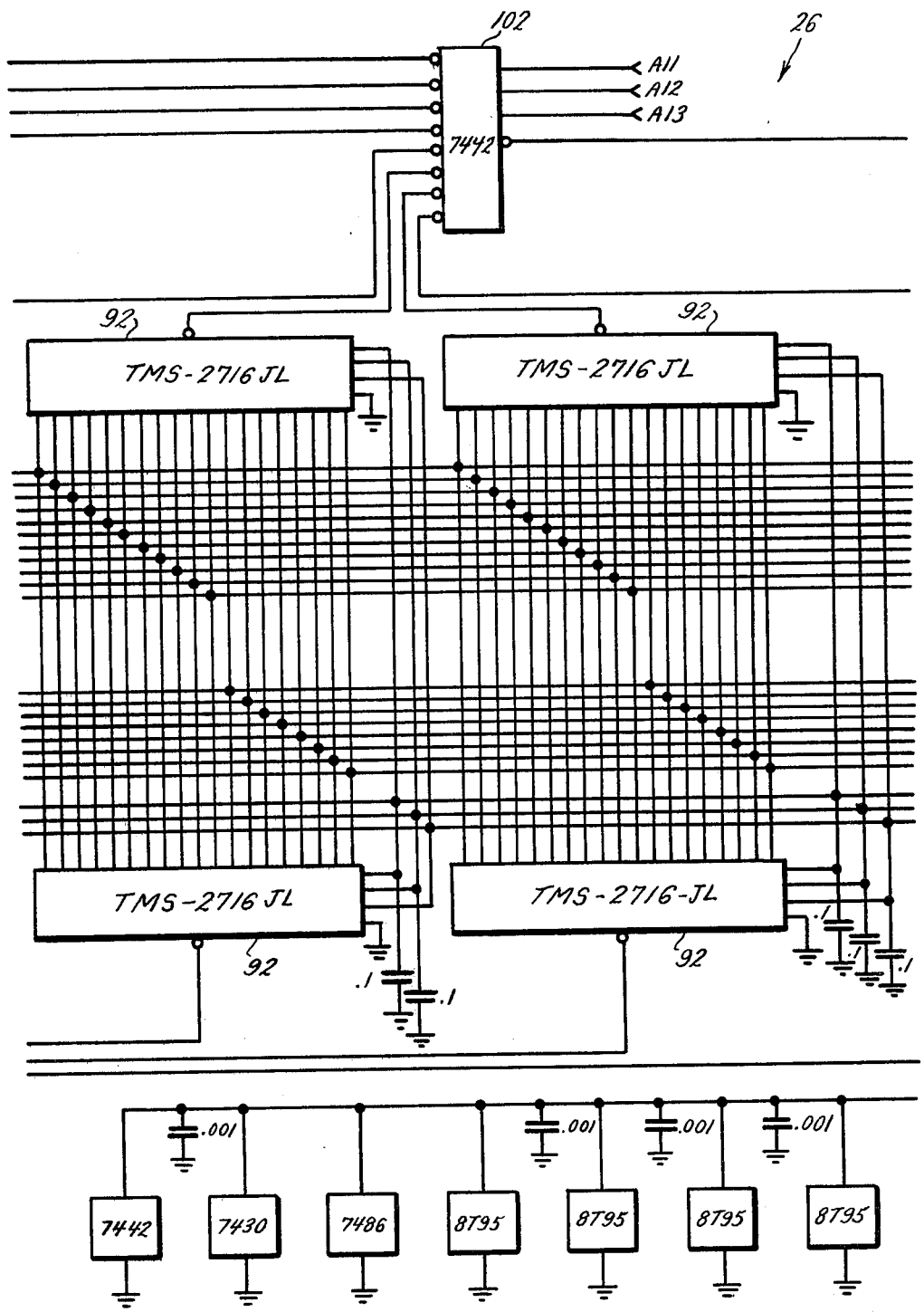
Figure 3C:
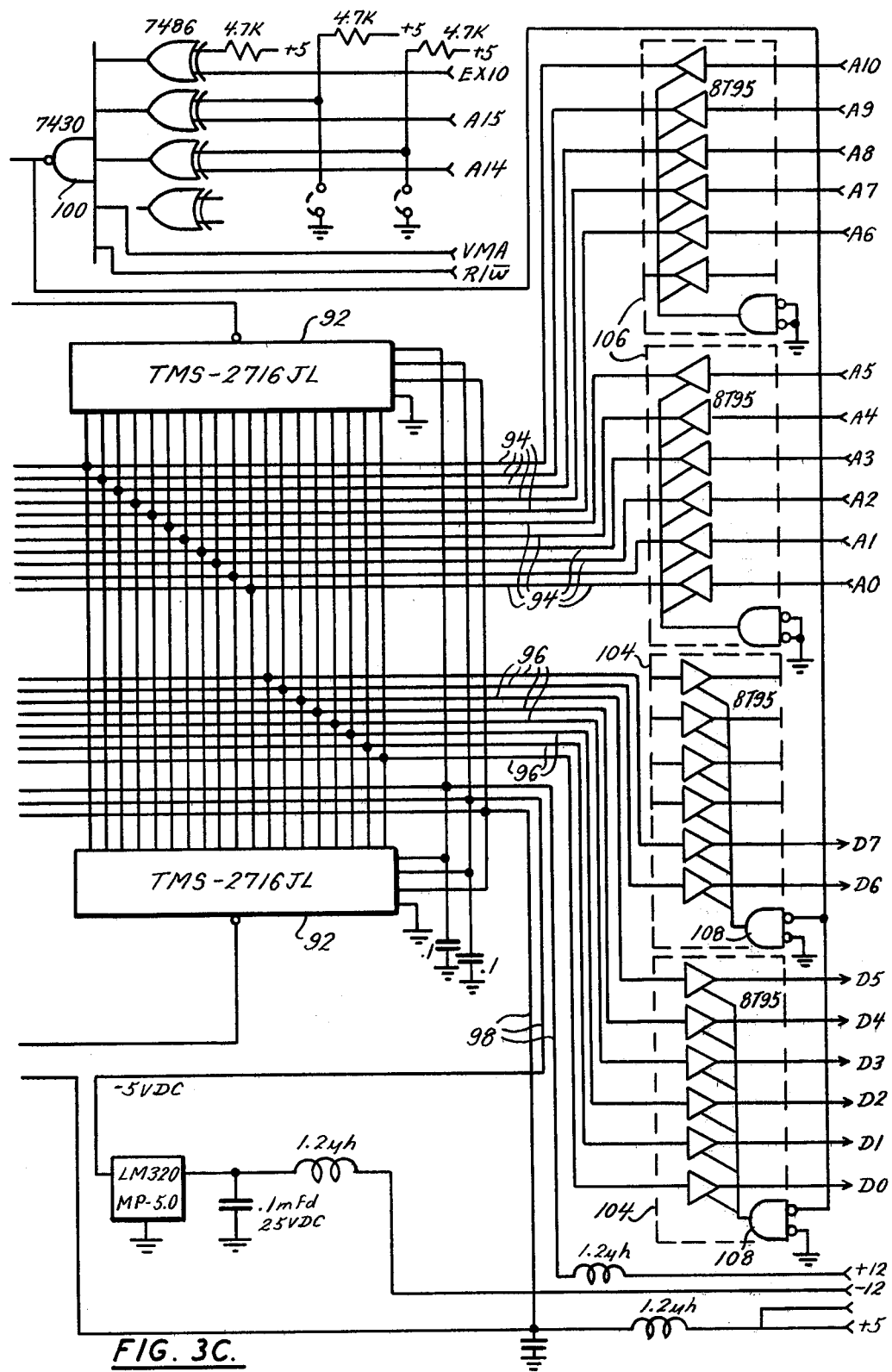

The 16K PROM board 26 as shown in FIGS. 3A–3C provides additional memory to the microprocessor 42 and includes eight 2K PROM chips 92, an eleven bit address bus 94, an eight bit data bus 96, and a three bit power bus 98. An address decoder 100 uses three bits of address data to select one of four possible PROM boards 26 and a second address decoder 102 uses three bits of address data to select one of eight PROM chips 92 on the PROM board 26. A data buffer 104 and an address buffer 106 are provided to terminate the data bus 96 and address bus 94 respectively. The data buffers 104 are selectively inhibited by the inhibit gates 108 until the board select decoder 100 produces a pulse corresponding to the microprocessor 42 accessing the particular PROM board 26.

4K RAM PC Board

Figure 4A:
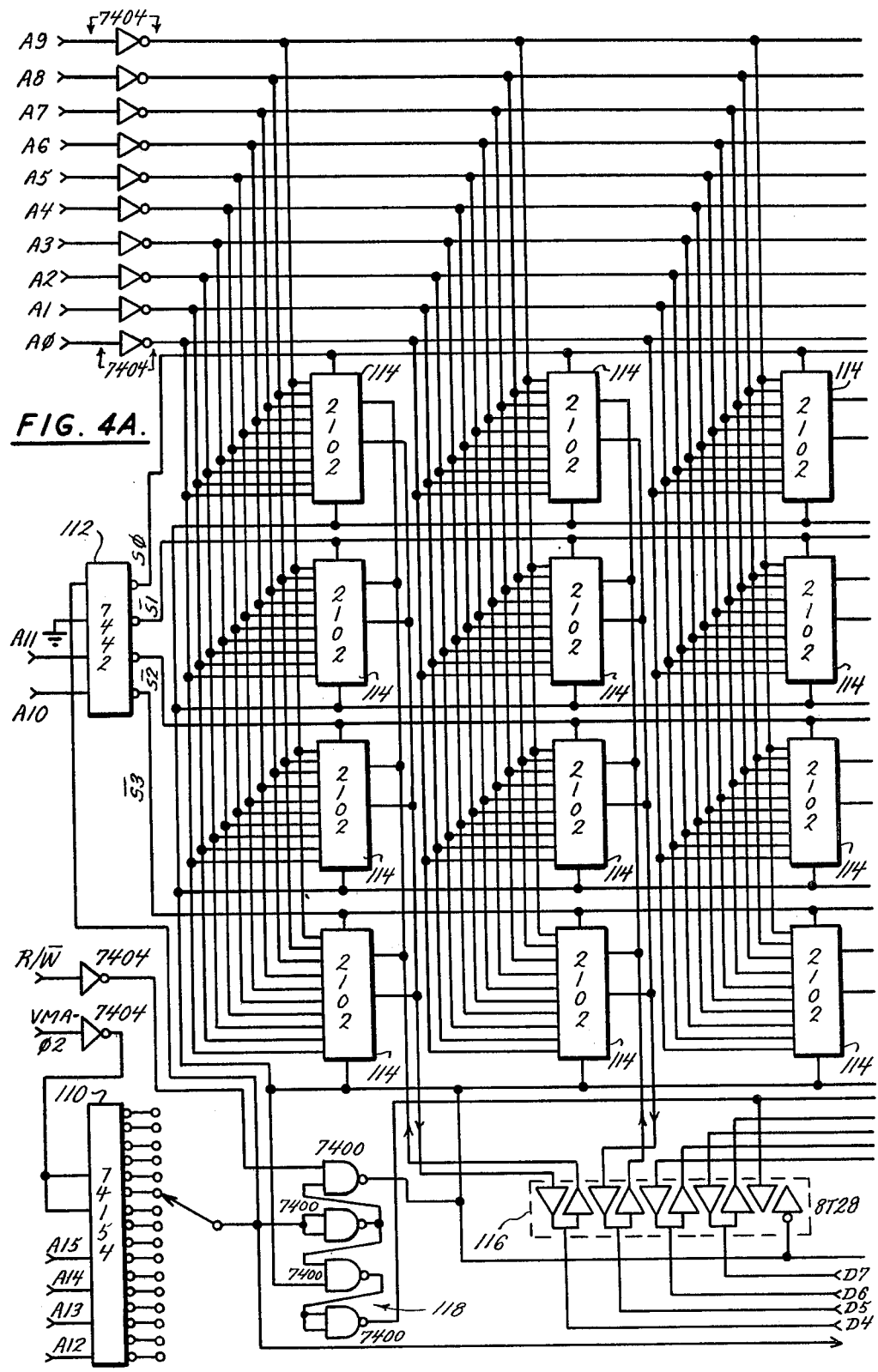
FIGS. 4A–4C depict a 4K RAM printed circuit board.
Figure 4B:
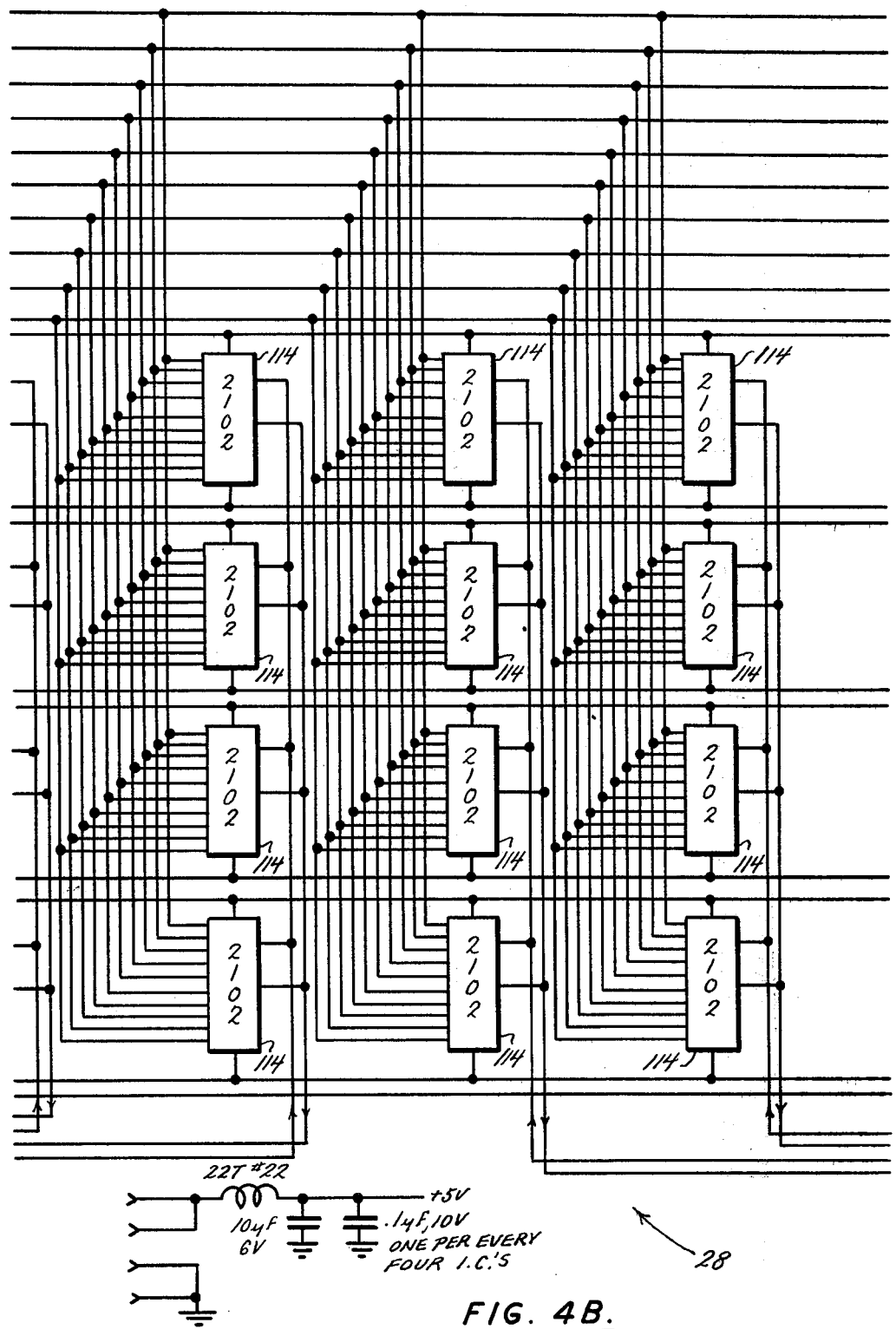
Figure 4C:
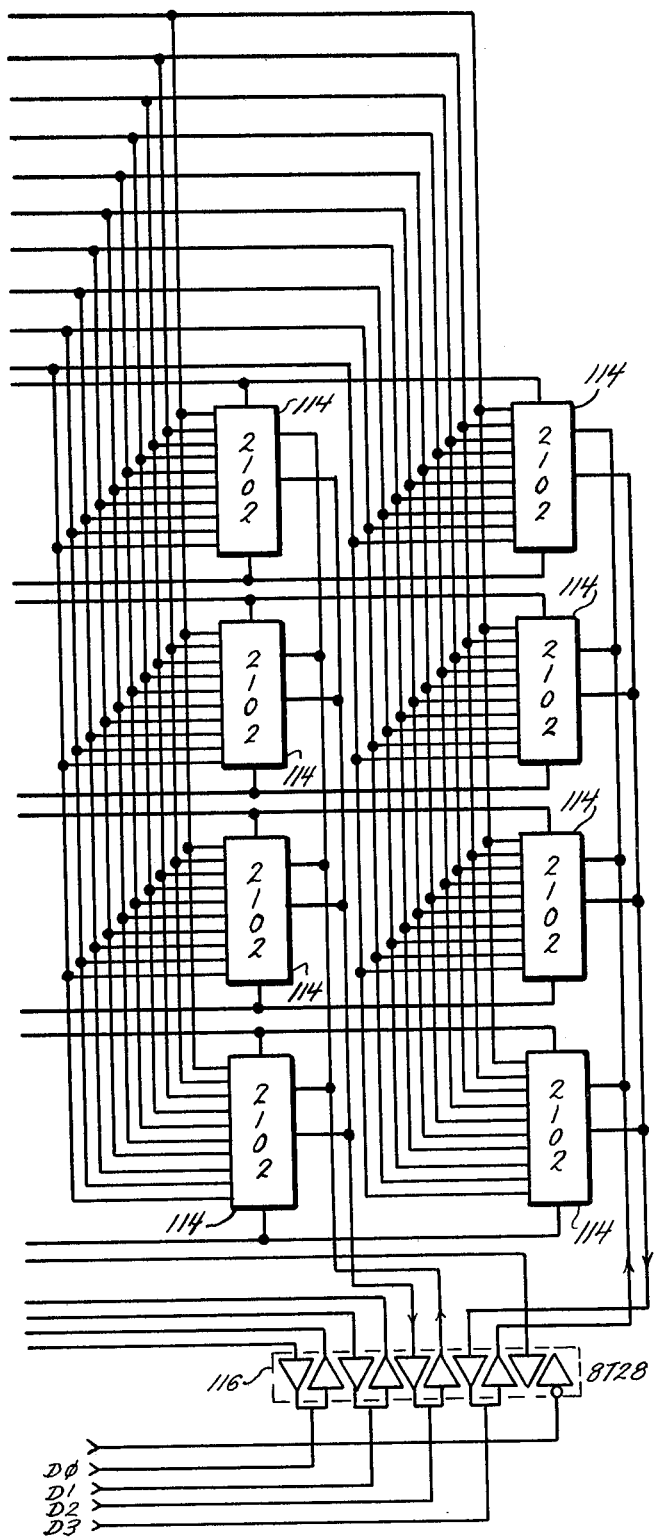
Figure 5A:
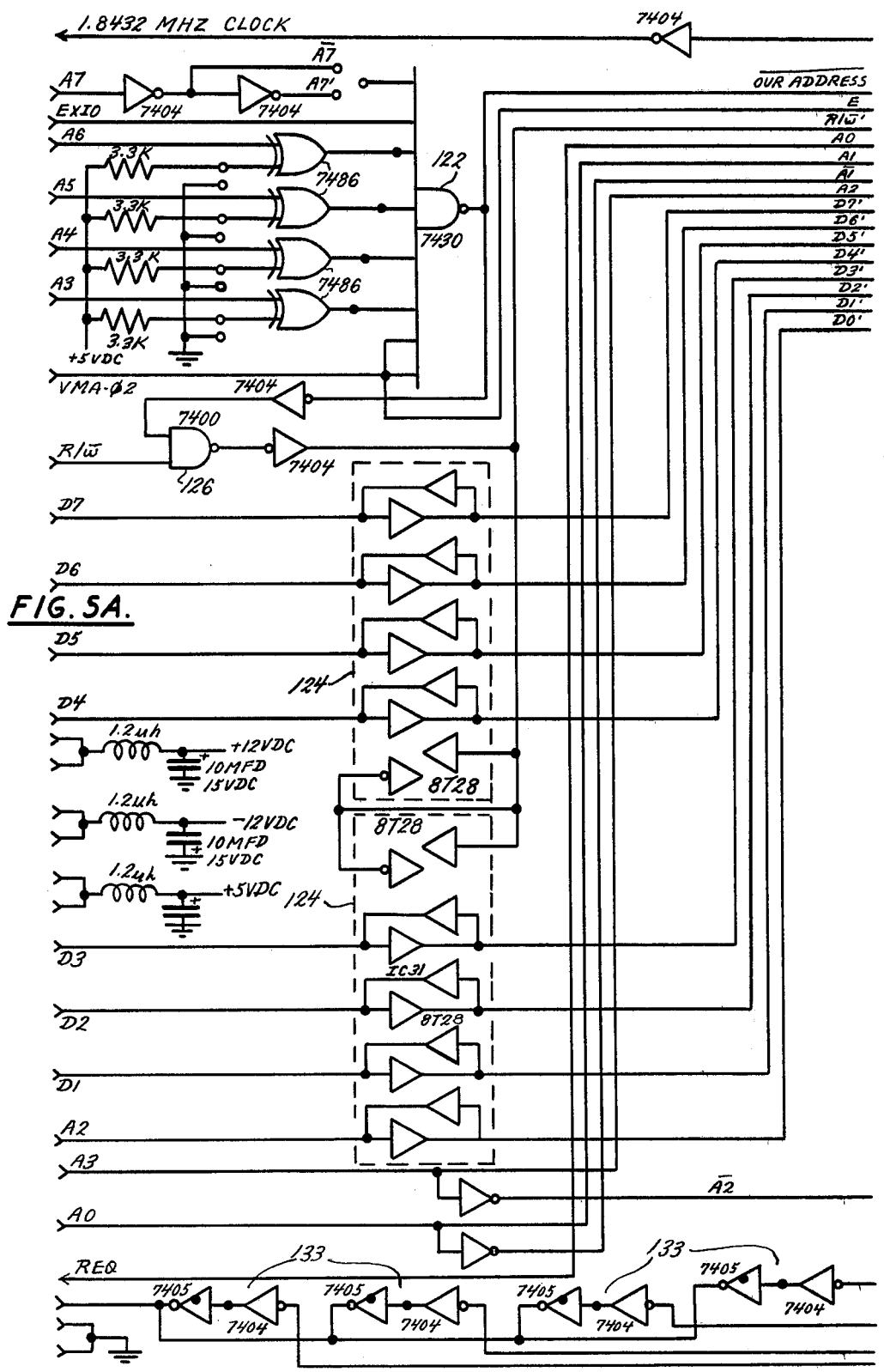
Figure 5B:
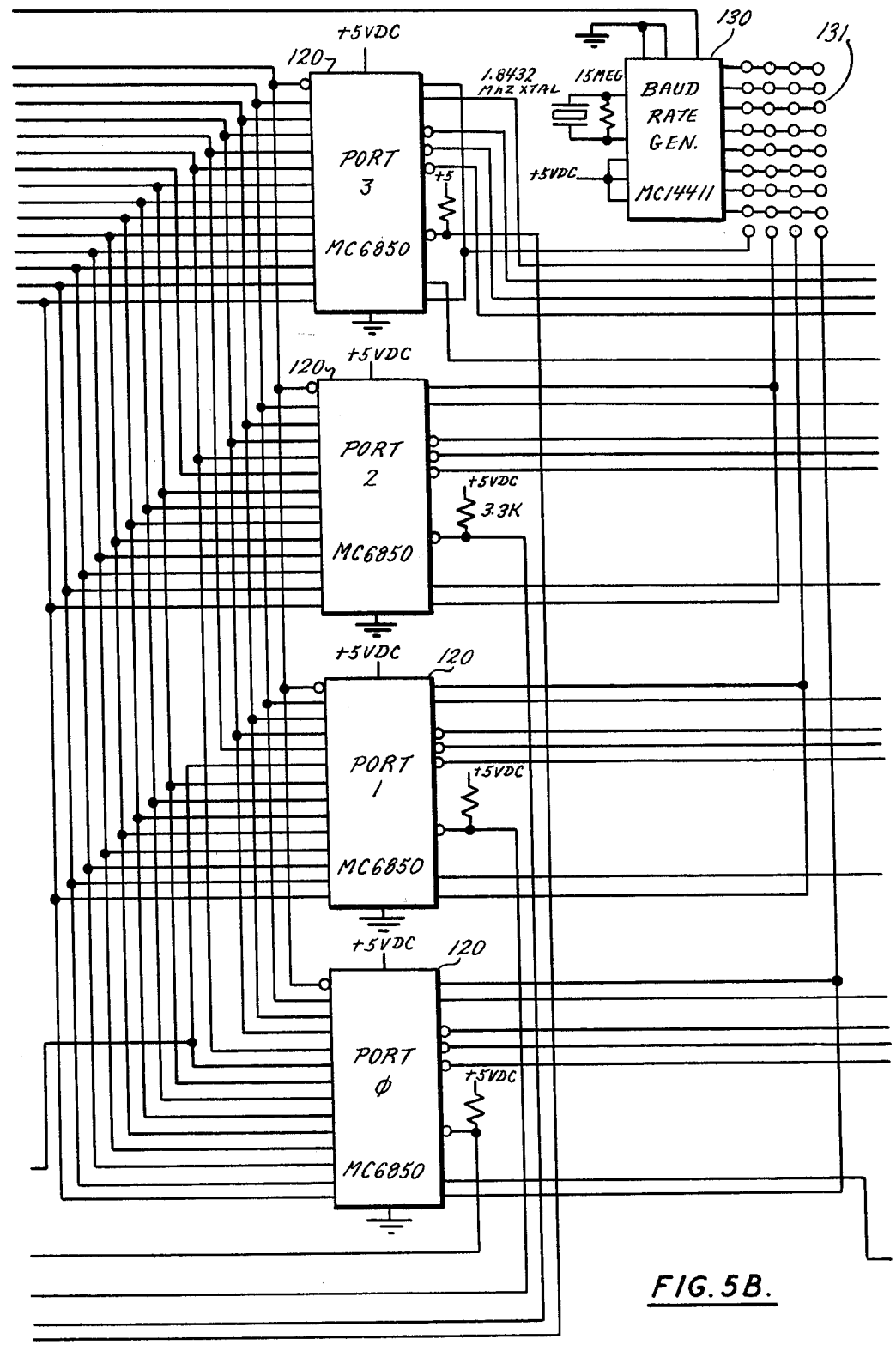
Figure 5C:
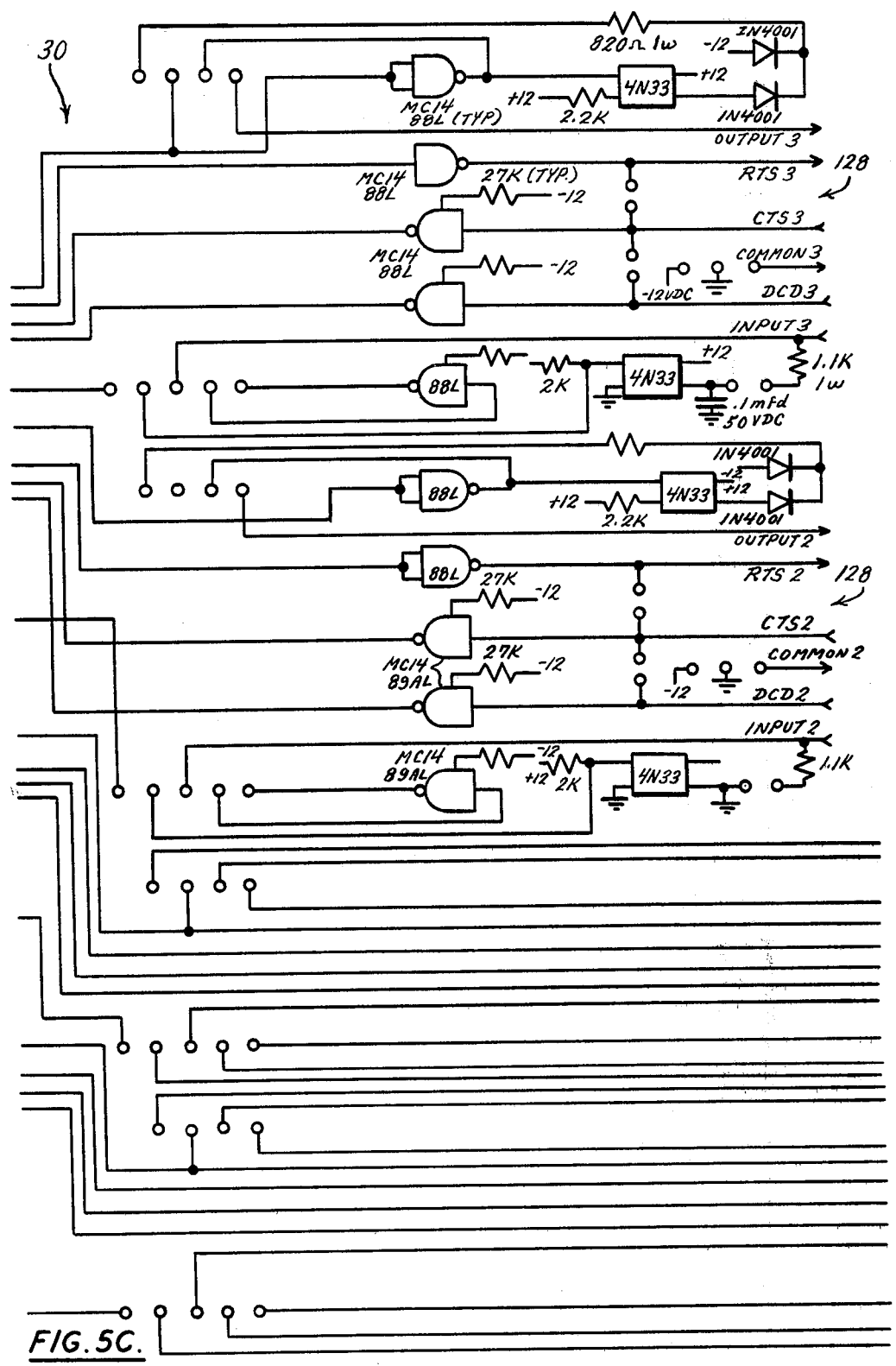

The 4K RAM board 28 as shown in FIGS. 4A–4C includes a board select decoder 110 using four bits of address data to select one of sixteen boards. A row select address decoder 112 uses two bits of address data to select one of four rows. There are thirty-two 1 bit 1K chips 114, each of which stores one bit of an eight bit byte of a data word. Data buffers 116 are provided along with a r/$\overline{w}$ inhibit circuit 118 to selectively isolate the chips 114 and allow data flow only in the read or write direction, as selected.

Serial Input/Output Data Board

The serial input/output data board 30 as shown in FIGS. 5A–5D contains four bi-directional data ports 120 each of which can convert serial input data to parallel format and parallel output data to serial format to permit a peripheral device having a serial format to communicate with the microprocessor 42. A board address decoder 122 generates a control signal when the specific board is addressed with address bits A3–A7 and EXIO. A data buffer 124 is provided and an inhibit gate 126 selectively enables data buffer 124 in response to a r/$\overline{w}$ signal and a board select signal. An interface circuit 128 is provided at each data port 120 and has selectable strapping to accommodate data from either a TTY, RS232, or TTL source, as is known in the art. Also, a baud rate generator 130 and option strap 131 permit the selection of a data rate corresponding to the data source at each data port 120. An $\overline{IRQ}$ circuit 133 conditions an interrupt request from any of the data ports 120 when data conditions exist which require immediate microprocessor 42 attention. At least one telephone operator's console (32 in FIG. 1) may be connected to one of the data ports 120 and used to centrally control the PBX portion of the controller 20. As mentioned above, up to three serial input/output data boards 30 may be provided in my preferred embodiment.

Interface Board

Figures 6A, 8:
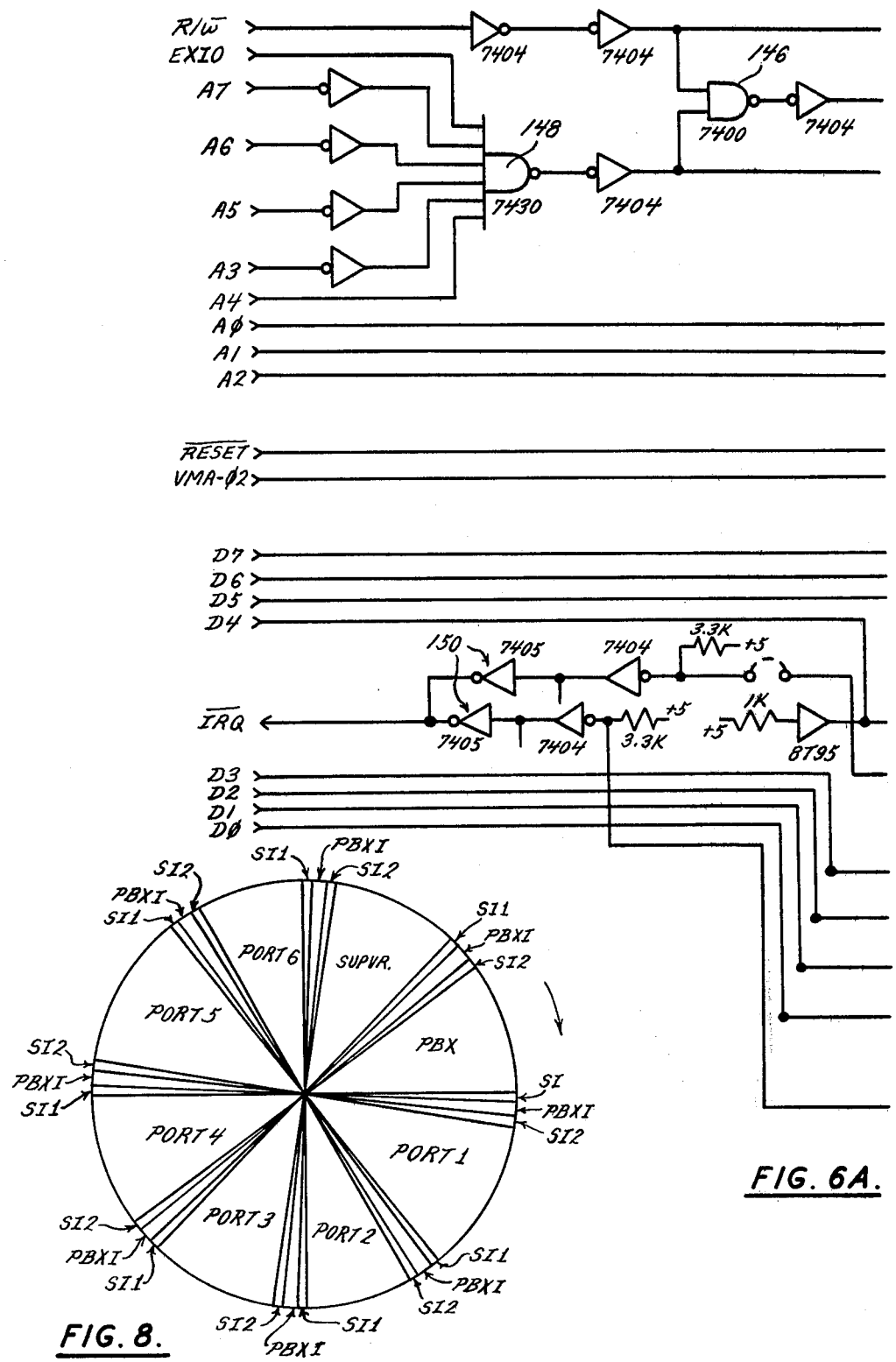
FIGS. 6A–6B depict an interface printed circuit board for connection of a disc drive and other peripherals.
FIG. 8 is a chart explaining the allocation of processing time.
Figure 6B:
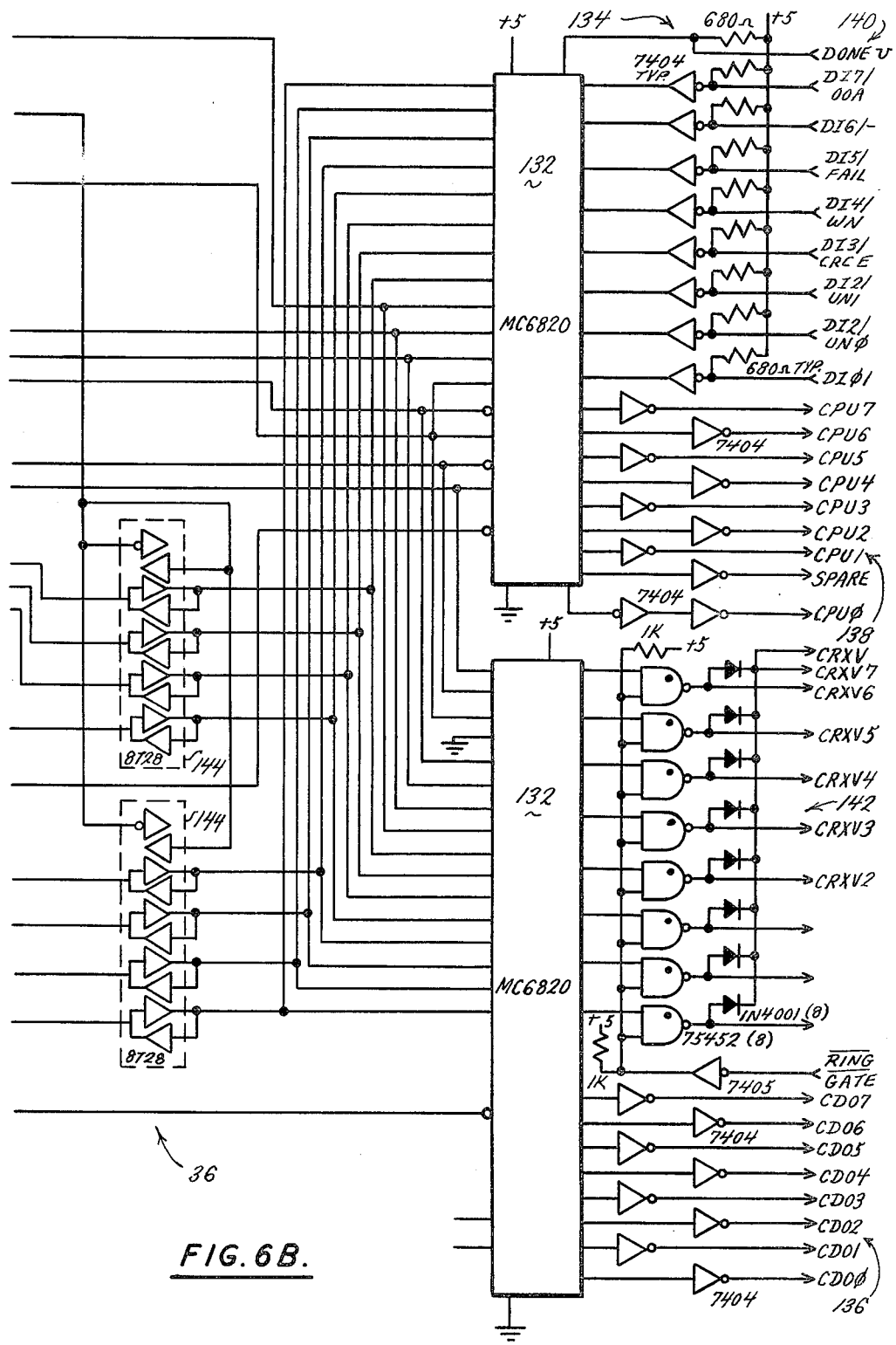

The interface board 36 as shown in FIGS. 6A–6B includes two data ports 132 and interface circuitry 134 for a disc type memory including disc data circuitry 136, disc command circuitry 138, and disc monitoring circuitry 140. A plurality of relay drivers 142 are also provided to operate relays in place of the hook switch on the operator's console 32 and night bells for the PBX. Data buffer 144 is provided and an inhibit gate 146, which operates similarly to those previously described. A board select address decoder 148 generates a control signal, as before, and an $\overline{IRQ}$ circuit 150 issues the $\overline{IRQ}$ signals generated by the data port 132.

The PBX Interface Board

The PBX interface board 40 as shown in FIGS. 7A–7B may be assigned to slot 16 and provides buffering and signal conditioning to interface my controller 20 with various designs of PBXs. For some PBX designs, it might not be necessary to include a PBX interface board 40 as the buffering and signal conditioning may be provided on the input side of the PBX or may not be required. The circuitry shown will accommodate a typical PBX and is described for illustration only.

Included in the board are two address latches 152 which stabilize the address information and allow it to remain available to the PBX for an extended length of time. An address decoder 154 preselects one of four groups of what may be shelfs or trunk ports or line ports. For example, four bits of address data may be used to select one of sixteen shelves (MA6–MA9), two bits of address data may be used to select which group of sixteen out of sixty-four shelves (control signals $\overline{SB0}$–$\overline{SB3}$), four bits of address data to select one of sixteen boards in a shelf (MA2–MA5), one bit of address data to select one of two ports on a board (MA1), and one bit of address data to select one of two sub-functions at that port (MA0).

Similarly, two data latches 156 stabilize the data for writing into two data buffers 158. Data buffers 158 and address latches 152 are enabled to permit the transmission of data therethrough. As data is transmitted in both the read and write direction on the data bus, bus ways 160 bypass data latches 156 in the read mode which eliminates the requirement of enabling signals for data latches 156. An address decoder 162 decodes four bits of address data to enable the signal conditioning circuit 164 only when the microprocessor 42 is reading or writing data into the PBX circuit downstream of the PBX interface board 40. The output of address decoder 162 is inverted by inverter 166 which provides one of the primary inputs into signal conditioning circuit 164. The other primary input is taken from the r/$\overline{w}$ signal generated by the microprocessor 42. Inverter 166 output is used directly to enable address latches 152. Signal conditioning circuit 164 utilizes the output of inverter 166 and the r/$\overline{w}$ signal and the output of inverter 168 which inverts the r/$\overline{w}$ signal to produce a master select signal of read or write and a master strobe signal which are output on busses 170 and 172 respectively.

The master write signal and strobe signal are produced as follows. A negative pulse is input to inverter 168 which produces a positive pulse output to one input of AND gate 174. The other input of AND gate 174 is a positive pulse from inverter 166 which is produced as a result of a proper address to address decoder 162. AND gate 174 outputs a negative pulse to trigger flip flop 176 and produce a negative pulse on bus 170. Simultaneously, flip flop 176 outputs a positive pulse to enable data buffers 158 over bus 178. Also simultaneously, output of AND gate 174 is inverted by inverter 180 and fed into two timed Schmitt triggers 182 and 184. The first Schmitt trigger 182 provides a 200 to 250 nanosecond delay and its output is used to enable data latches 156, so that both data latches 156 and data buffers 158 are enabled in the write condition. The second Schmitt trigger 182 provides a 1.1 microsecond delay which produces a negative pulse to NOR gate 186, producing a positive output to inverter 188 which in turn produces a negative pulse output to master select A along bus 172. Thus, signal conditioning circuit 164 produces a negative write latch signal along bus 170 and a write strobe signal of limited duration along bus 172 while enabling data latches 156, data buffers 158, and address latches 152.

In the read mode, the read signal is input to AND gate 190 along with the output of inverter 166 which turns on AND gate 190, thereby producing a negative pulse output to NOR gate 186 which in turn produces a negative pulse strobe signal through inverter 188 along bus 172. A read pulse is produced by Schmitt trigger 192 whose input is the output of inverter 166. Schmitt trigger 192 triggers flip flop 176 to produce a positive going pulse along bus 170 and also provide a positive input to AND gate 194. The other positive input is provided by the output of inverter 166 and AND gate 194 produces a negative pulse to enable the data buffers 158 along the read enable bus 196. Thus, signal conditioning circuit 164 produces a positive read pulse along bus 170, a read strobe along bus 172, and a read enable signal to data buffers 158 along bus 196.

I have also included on this board a protective circuit to cause a master reset of the entire controller 20 should a write signal fail to occur approximately once every 42 milliseconds. This failure would indicate that there was a microprocessor 42 malfunction as a microprocessor 42 is more apt to "stick" in the read condition instead of the write condition which would therefore cause a period of time longer than 42 milliseconds to occur between write signals. As shown, this protective circuit 198 has an input of a master bus reset signal which is used to reset address latches 152 and data latches 156 after being conditioned by inverters 200. Schmitt trigger 202 switches on transistor 204 in response to each bus reset signal which provides a discharge path for capacitor 206 through resistor 208. With a time constant of approximately half a second, capacitor 208 will not discharge, as a bus reset pulse occurs much more frequently than every half a second. Capacitor 206 keeps transistors 210 and 212 turned on and a voltage across resistor 214 so that Schmitt trigger 216 maintains a negative signal into the negative input gate of one shot 218. Negative write pulses are input to one shot 220 which has a time constant of approximately 42 milliseconds. Thus, if a negative write pulse is input more often than once every 42 milliseconds, the timing circuit of one shot 220 does not time out and an output pulse will never be produced by one shot 220. However, should the microprocessor 42 stick in the read mode, then one shot 220 would produce an output pulse which would trigger one shot 218 and turn transistor 222 on and cause a master reset signal back on the MPU board 22. This protective circuit as well as others may be easily included in the PBX interface board 40 to suit any particular application.

Operation

As disclosed, my microprocessor controller includes a central processor with memory and necessary interface circuitry which is suitable for stored program control. One portion of the software package would control the PBX portion of the computer's tasks including switching, connecting, and necessary processing of telephone communications including generating and decoding of dial pulses and control tones and the necessary logic to provide the desired optional features in a PBX, as is known in the art. Additionally, program control is required to set up a time sharing capability between the six input/output data ports and the associated functions including partitioning of memory to limit access to memory locations, provision of an interpretive language such as BASIC, and other necessary functions, as is known in the art. These individual sections of program control must be combined in a manner so as to ensure continuous and reliable operation of the PBX portion of the device while also making time available to the individual data ports so that processing times are not unduly long. To provide access to both the PBX portion and the time sharing portion of the programs, I have provided a guarded connector to which a command terminal may be connected and the supervisory program control includes further non-obvious program keys or programmer's labels which, if known to the operator, permit the command terminal to gain access, modify, delete, and add to the individual partitions of memory assigned to each input/output terminal as well as the PBX data and file information, such as would be required to change automatic billing, class of service, etc. By locating the command terminal connector inside the controller cabinet, greater security and confidentiality may be ensured to prevent computer theft and fraud or even the inadvertent tampering with what should be inaccessible data, such as the PBX program. As the command terminal is given its powers by the software package, my device can accommodate a command terminal at any port by merely changing the supervisory program accordingly. The command terminal may also be used to troubleshoot any equipment failures and provides ready access at the equipment location for the serviceman as is desirable in troubleshooting equipment.

Although various kinds of supervisory programs may be developed to suit particular installations, I have devised a unique approach to allocating the processing time of the central processor which ensures both the desirable goals of prompt phone service and PBX operation without undue delay in processing information for the input/output ports. This supervisory program is disclosed herein at the end of the preferred embodiment. A functional description of its operation follows.

As shown in FIG. 8, the central processor processing time is divided into cycles of 160 milliseconds, each cycle having eight slices of 20 milliseconds, each of which is further sub-divided as shown in the drawings. If all data ports are being utilized, and the PBX is being operated at close to its maximum capacity, then the machine processing time would continue in cycles of 160 milliseconds around the complete circle as shown in the drawing. However, as explained more fully below, if one or more of the input terminals are not being used, or if the supervisory programs senses either than an input/output port is not calling for processor time and is either in the input or output mode, or that the PBX program is demanding processor time, or that the supervisory program has completed its checks without using all of its processing time, then various portions of each slice may be skipped over or aborted so that processor idle time is not experienced. This significantly increases the time sharing capabilities of the central processor and ensures optimum PBX operation. This approach also allows me to make maximum use of the hardware capability to drive expanded chunks of memory and peripheral devices.

Referring now to FIG. 8, a first slice is sub-divided into four sections, the first of which being SI1. During SI1, the processor is used to compute and update the time of day and to check to see if the next slice is calling for processing time. Presuming processing time is called for, the processor is then assigned to the PBXI program which checks for the sensing or sending of dial pulses and its decoding as well as the accumulation and decoding of tones which are used to provide options at each extension of the PBX, as is known in the art. PBXI takes from one half millisecond to ten milliseconds of processing time. The next portion of program to run would be SI2 which checks for any program which is calling for processing time. During this slice, the supervisory program would receive top priority and if it was calling for processing time, processing time would then follow as shown in the figure. If no processing time was being called for, then program control would shift and abort the supervisory run portion of this time slice and the next program requesting processing time which would be PBX. If PBX was not calling for processing time, then the shift would be made all the way through each of the individual data ports until one was found calling for processing time; or if none then back to PBX for its designated time span. Presuming supervisory program was calling for processing time, it would normally be used to supervise the trunk and line ports to detect changes of status, or scan the various data ports including the disc port to input, output or process data. The processing time of supervisory would be 0.15 milliseconds minimum and the maximum would be 20 milliseconds minus the time required to process the first time slice portions.

As indicated in the drawing, the first three portions are repeated for each time slice and each data port is given top priority for demanding processing time from the computer at least once during each 160 milliseconds cycle, presuming there would be no aborting or collapsing of time slices.

My approach is unique in that the allocation of processing time is maximized and parsimoniously distributed amongst the various programs which may be loaded and running. This technique takes maximum advantage of the processing time available and ensures maximum utilization of the hardware.

While I have disclosed a specific embodiment utilizing the teachings of his invention, it is disclosed for purposes of illustration only. Changes and modifications would be readily apparent to one of ordinary skill in the art and I intend that the scope of his invention be limited only by the claims appended hereto.

```
00001                          NAM     TBUG       REV 7.0
00002                          OPT     O,S

00004                       *  COPYRIGHT THORSON 1979
00005                       *  LAST ACCUESS 9/5/80
00006                       *
00007                       *  PROGRAMMER  ** JOHN T. THORSON **

00009                       *
00010                       *  THIS PROGRAM IS THE PROPERTY OF:
00011                       *
00012                       *  EASCOM INC.
00013                       *
```

```
00014                   * 5400 MC DERMOTT DR.
00015                   * BEREKELY, ILL. 60163
00016                   * PHONE (312)-449-1710
00017                   *

00019 0000                      ORG     $0

00021 0000 0001  PASS   RMB     1
00022 AC00                      ORG     $AC00
00023 AC00 0001  OFILE  RMB     1
00024 AC01 0001  OUNIT  RMB     1
00025 AC02 0001  IUNIT  RMB     1
00026 AC03 0002  ISIZE  RMB     2
00027 AC05 0001  ITRK   RMB     1
00028 AC06 0001  ISCTR  RMB     1
00029 AC07 0001  ICNTR  RMB     1
00030 AC08 0002  OSIZE  RMB     2
00031 AC0A 0001  OTRK   RMB     1
00032 AC0B 0001  OSCTR  RMB     1
00033 AC0C 0001  OCNTR  RMB     1
00034 AC0D 0001  TITRK  RMB     1
00035 AC0E 0002  TISZE  RMB     2
00036      0020  EXEC   EQU     $20
00037      0023  UPDAT  EQU     $23

00039 AC30              ORG     $AC30
00040      AC2F  ASP    EQU     *-1      STARTING NEW PARTITION SP
00041 AC30 0002         RMB     2        NEW PART IOXSAVE
00042 AC32 0002         RMB     2        SPACE FILLER FOR MAKE JUMP
00043 AC34 0002  IONP   RMB     2        NOTE IO LOW/HI REV
00044 AC36 0001  CCNP   RMB     1        CC REG NEW PARTITION
00045 AC37 0001  BRNP   RMB     1        B REG. NEW PARTITION
00046 AC38 0001  ARNP   RMB     1        A REG. NEW PARTITION
00047 AC39 0002  XRNP   RMB     2        X REG. NEW PARTITION
00048 AC3B 0002  PCNP   RMB     2        PC REG. NEW PARTITION

00050 AC61              ORG     $AC61
00052              *
00053              * THIS IS TBUG A REAL TIME MONITOR
00054              * THE COMMANDS ARE :
00055              *  A = DISPLAY PARTITIONS
00056              *  B = BEGAIN PARTITION
00057              *  C = CONT. PARTITION
00058              *  D = DISPLAY MEMORY
00059              *  F = CALL FILE PROGRAM BOSS
00060              *  G = GO TO TARGET PROGRAM
00061              *  H = HALT PARTITION
00062              *  L = LOAD PROGRAM
00063              *  M = MODIFY MEMORY
00064              *  P = PUNCH MEMORY IMAGE
00065              *  R = DISPLAY TARGET REGISTORS
00066              *      CC  B  A  X  P  S
00067              *  S = SET TIME
00068              *  T = DISPLAY TIME
00069              *
00071              *
00072              * I/O ADDRESSES
00073              *

00075      AB80   TTYS   EQU    $AB80    IF NEW PROCESSOR SET TO $AB80
00076      AA10   DKDID  EQU    $AA10
00077      AA11   DKDIC  EQU    $AA11
00078      AA12   DKCOD  EQU    $AA12
00079      AA13   DKCOC  EQU    $AA13
```

```
00080        AA16    DKDOD  EQU    $AA16
00081        AA17    DKDOC  EQU    $AA17

00083        AC60    STACK  EQU    *-1
00084 AC61 0005             RMB    5
00085 AC66 0002      GOPC   RMB    2
00086 AC68 0001      FLAG   RMB    1           FLAG CONTROL MONITOR
00087 AC69 0001      CKSM   RMB    1
00088 AC6A 0001      BYTECT RMB    1
00089 AC6B 0001      TEMP   RMB    1
00090 AC6C 0002      BEGA   RMB    2
00091 AC6E 0002      ENDA   RMB    2
00092 AC70 0001      XHI    RMB    1
00093 AC71 0001      XLOW   RMB    1
00094 AC72 0002      SP     RMB    2
00095        AC70    TW     EQU    XHI

00097 AC74 0002      ISOFTP RMB    2
00098 AC76 0001      DAYLIM RMB    1
00099 AC77 0001      KSEC   RMB    1
00100 AC78 0001      KMIN   RMB    1
00101 AC79 0001      KHR    RMB    1
00102 AC7A 0001      KDAY   RMB    1
00103 AC7B 0001      KMO    RMB    1
00104 AC7C 0001      KYEAR  RMB    1
00105 AC7D 0001      SECF   RMB    1
00106 AC7E 0001      XSEC   RMB    1
00107 AC7F 0001      FLAG1  RMB    1
00108 AC80 0001      FLAG2  RMB    1           FLAGS TO BE USED LATER?
00109                * THE P CONTROL BLOCK
00110                * BYTE 0 STATUS IF ZERO OFF
00111                *   IF 1 PROTECTED
00112                * IF 80 ERROR HANDLING BY CALLER
00113                *
00114                * BYTE 1,2 CURRENT STACK POINTER
00115                * BYTE 3,4 XSAVE ON CALL SWI
00116                * BYTE 5,6 COMMAND TERMINAL ADDRESS
00117                *
00118 AC81 001C      PPNTF  RMB    28          SPACE FOR 4 PART.
00119        AC9D    PPNTL  EQU    *
00120 AC9D 0001      PHASE  RMB    1
00121 AC9E 0002      FLAG3  RMB    2           SAVE FOR BOUNDRY
00123                *
00124                * PBX PROGRAM ENTRYS FROM DEBUG
00125                *

00127 ACA0 0002      PGMFLG RMB    2           INITILASE PBX ENTRY POINTER
00128 ACA2 0004             RMB    4
00129 ACA6 000A      PHASEP RMB    10
00130                *   FDB   I20MS4
00131                *   FDB   I20MS3
00132                *   FDB   I20MS2
00133                *   FDB   I20MS1
00134                *   FDB   I20MS0

00136        ACAF    SPEND  EQU    *-1
00137 ACB0 0002      PPOINT RMB    2
00138 ACB2 0002      XSWIPR RMB    2
00139 ACB4 0002      XNMIPR RMB    2
00140                *
00141                * DISK SECTOR MAP
00142                *
00143 ACB6 0001      UNIT0  RMB    1           DENSITY
00144 ACB7 001A      UNIT0A RMB    26          SECTOR MAP
```

```
00145 ACD1 0001    UNIT1  RMB   1        DENSITY
00146 ACD2 001A    UNIT1A RMB   26       SECTOR MAP
00147 ACEC 0001    UNIT2  RMB   1        DENSITY
00148 ACED 001A    UNIT2A RMB   26       SECTOR MAP
00149 AD07 0001    UNIT3  RMB   1        DENSITY
00150 AD08 001A    UNIT3A RMB   26       SECTOR MAP
00151      AD22    ENDSPR EQU   *
00153      0012    CCRLF  EQU   18
00154      0011    COUCH  EQU   17
00155      0010    CINCH  EQU   16
00156      000F    CINNE  EQU   15
00157      0013    CPDATA EQU   19
00158      0014    CPDAT1 EQU   20
00159      0017    CDUMP  EQU   23
00161              *
00162              * NOW FOR PROGRAM ENTRYS (JUMP TABLE)
00163              *

00165 F600         ORG   $F600
00166 F600 7E F945 START1 JMP   CONTRL
00167 F603 7E F808 CHEXX  JMP   CHEX
00168 F606 7E FBE2 XINNE  JMP   XNNOEC    XNPUT NO ECCO
00169 F609 7E FBF0 XINPUT JMP   XNPUT     INPUT AND ECCO
00170 F60C 7E FBF2 XOUTCH JMP   XUTPUT    OUTPUT A XHARR
00171 F60F 7E FC2E XCRLF  JMP   XRLF      DO CR/LF
00172 F612 7E FC32 XPDATA JMP   PDATA     DO CR/LF STRING
00173 F615 7E FC34 XPDAT1 JMP   PDATA1    PRINT STRING
00174 F618 7E FC40 XISTAT JMP   XTATUS    GET INPUT STATUS
00175 F61B 7E FC4D XMODE  JMP   XODE
00176 F61E 7E FC56 XDUMP2 JMP   XUMP2     DUMP TWO INPUT CHARRS
00177 F621 7E FB97 XTIME  JMP   PTIME1    PRINT TIME AND DATE
00178 F624 7E FBB6 XCRIS  JMP   CRLFIS    DO CRLF INPUT STRING
00179 F627 7E FBB8 XIS    JMP   IS        INPUT STRING
00180 F62A 7E FD15 XCALDA JMP   CALDAY    CALUATE DAY LIMIT FOR MONTH
00181 F62D 7E F84A XOUT2H JMP   OUT2H
00182 F630 7E F853 XOT4HS JMP   OUT4HS
00183 F633 7E F855 XOT2HS JMP   OUT2HS
00184 F636 7E F857 XOUTSP JMP   OUTSP
00185 F639 7E FDD8 XRESET JMP   RESET     RESET DISK DRIVE ELECTRONICS
00186 F63C 7E F7CA XFDOS  JMP   BADDA     BUILD ADDRESS IN XHI,XHL
00187 F63F 7E F7DC XUPDAT JMP   BYTE      BUILD A BYTE IN A REG.
00188 F642 7E FE07 XDLOAD JMP   DLOAD     LOAD PROGRAM AND RETURN TO TB
00189 F645 7E FE0C XLOADG JMP   LOADGO    LOAD AND GO TO $20
00190 F648 7E FC60 XSETIO JMP   SETIO     SET COMMAND TERM=X
00191 F64B 7E FE37 XRIX   JMP   RIX       GET A BYTE FROM DISK
00192 F64E 7E FE98 XINCDA JMP   INCDA     UPDATE TRACK SECTOR
00193 F651 7E FEE9 XXUS   JMP   XUS       SEND UNIT SECTOR INFO
00194 F654 7E FF2F XSEEK  JMP   SEEK      FIND TRACK
00195 F657 7E FEAC XLOOP  JMP   LOOP      SEND COMMAND
00196 F65A 7E FECA XRFLAG JMP   RFLAG     RESET DISK ERROR FLAG
00197 F65D 7E F7B7 XWRT   JMP   FROMTO    BUILD FROM TO ADDRESS
00198 F660 7E FE15 XREND  JMP   REND      REWIND INPUT FILE
00199 F663 7E FE7A XRI10  JMP   RI10      GET BYTE FROM BUFFER
00201              *
00202              * CONSTANTS AND TABLES
00203              *

00205              *
00206              * THIS IS THE SWI SERVICE ROUTINE
00207              *

00209 F666 FE ACB2 SWISVC LDX   XSWIPR
00210 F669 6E 00          JMP   0,X
00211 F66B 30    SWISVX  TSX
```

```
00212 F66C EE 05              LDX      5,X
00213 F66E A6 00              LDA A    0,X          GET CALL CODE
00214 F670 81 2F              CMP A    #47          NUMBER OF VALID CALLS
00215 F672 2D 0F              BLT      SWISV4
00216 F674 26 0A              BNE      SWISV5
00217 F676 30                 TSX
00218 F677 6C 06              INC      6,X
00219 F679 26 02              BNE      *+4
00220 F67B 6C 05              INC      5,X
00221 F67D 7E FCAF            JMP      PIDLEO       THIS IS A WAIT TELL NEXT TIME
00222 F680 7E F9CC SWISV5     JMP      SFE          NOT VALID ABORT
00223 F683 36     SWISV4 PSH A
00224 F684 36            PSH A
00225 F685 36            PSH A
00226 F686 30            TSX
00227 F687 C6 05         LDA B    #5           MOVE 5
00228 F689 A6 03 SWISV7 LDA A    3,X
00229 F68B A7 01         STA A    1,X
00230 F68D 08            INX
00231 F68E 5A            DEC B
00232 F68F 26 F8         BNE      SWISV7
00233 F691 30            TSX                   REPOINT TO STACK
00234 F692 A6 00         LDA A    0,X
00235 F694 81 0D         CMP A    #13
00236 F696 2D 08         BLT      SWISV6
00237 F698 C6 F6         LDA B    #$F6         TABLE TBUG
00238 F69A 80 0D         SUB A    #13
00239 F69C A7 00         STA A    0,X
00240 F69E 20 08         BRA      SWISV3
00241 F6A0 C6 22 SWISV6 LDA B    #ENDSPR-$AD00
00242 F6A2 EB 00         ADD B    0,X
00243 F6A4 E7 00         STA B    0,X
00244 F6A6 C6 AD         LDA B    #$AD
00245 F6A8 48     SWISV3 ASL A                 MULT A BY 2
00246 F6A9 AB 00         ADD A    0,X          MULT BY 3
00247 F6AB 31            INS                   FORGET A SAVE
00248 F6AC A7 07         STA A    7,X
00249 F6AE E7 06         STA B    6,X          SUBROUTINE ADDRESS
00250 F6B0 A6 04         LDA A    4,X          GET X REG
00251 F6B2 E6 05         LDA B    5,X
00252 F6B4 6C 09         INC      9,X          BUMP RETURN
00253 F6B6 26 02         BNE      SWISV8
00254 F6B8 6C 08         INC      8,X          DONT MISS CARY
00255 F6BA FE ACB0 SWISV8 LDX     PPOINT
00256 F6BD A7 03         STA A    3,X          SAVE X TO P TABLE
00257 F6BF E7 04         STA B    4,X
00259 F6C1 3B            RTI
00260 F6C2 53     MSG1   FCB      /S/,1,4
      F6C3 31
      F6C4 04
00261        F6C5 MSG2   EQU      *
00262 F6C5 13     MSG3   FCB      $13,$14,13,'*,4
      F6C6 14
      F6C7 0D
      F6C8 2A
      F6C9 04
00263 F6CA 46     MSG4   FCC      /F =/
      F6CB 20
      F6CC 3D
00264 F6CD 04            FCB      4
00265 F6CE 54     MSG5   FCC      /T =/
      F6CF 20
      F6D0 3D
00266 F6D1 04            FCB      4
00267 F6D2 54     MSG6   FCC      /TIME /
```

```
              F6D3  49
              F6D4  4D
              F6D5  45
              F6D6  20
00268  F6D7  04              FCB      4
00269  F6D8  20       MSG7   FCC      /  DATE /
       F6D9  20
       F6DA  44
       F6DB  41
       F6DC  54
       F6DD  45
       F6DE  20
00270  F6DF  04              FCB      4
00271  F6E0  53       MSG8   FCC      /S9030000FC/
       F6E1  39
       F6E2  30
       F6E3  33
       F6E4  30
       F6E5  30
       F6E6  30
       F6E7  30
       F6E8  46
       F6E9  43
00272  F6EA  04              FCB      4
00273  F6EB  54       MSG9   FCC      /TBUG 7.0/
       F6EC  42
       F6ED  55
       F6EE  47
       F6EF  20
       F6F0  37
       F6F1  2E
       F6F2  30
00274  F6F3  04              FCB      4

00276  F6F4  50       MSG10  FCC      /P#  ADDP SS  SP  XNOW IOAD/
       F6F5  23
       F6F6  20
       F6F7  20
       F6F8  41
       F6F9  44
       F6FA  44
       F6FB  50
       F6FC  20
       F6FD  53
       F6FE  53
       F6FF  20
       F700  20
       F701  53
       F702  50
       F703  20
       F704  20
       F705  58
       F706  4E
       F707  4F
       F708  57
       F709  20
       F70A  49
       F70B  4F
       F70C  41
       F70D  44
00277  F70E  04              FCB      4
00278  F70F  50       MSG11  FCC      /P/
00279  F710  04              FCB      4

00281  F711  50       MSG12  FCC      /P# =/
```

```
            F712 23
            F713 20
            F714 3D
00282 F715 04              FCB     4

00284 F716 53      MSG13   FCC     /ST =/
      F717 54
      F718 20
      F719 3D
00285 F71A 04              FCB     4

00287 F71B 49      MSG14   FCC     /IO =/
      F71C 4F
      F71D 20
      F71E 3D
00288 F71F 04              FCB     4

00290 F720 52      MSG15   FCC     /RUN/
      F721 55
      F722 4E
00291 F723 04              FCB     4
00292 F724 32      JAN     FCB     $32,$30,$32,$31,$32,$31,$32,$32,$31
      F725 30
      F726 32
      F727 31
      F728 32
      F729 31
      F72A 32
      F72B 32
      F72C 31
00293 F72D 4F      MSG16   FCC     /OCC. /
      F72E 43
      F72F 43
      F730 2E
      F731 20
00294 F732 04              FCB     4,$32,$31,$32
      F733 32
      F734 31
      F735 32
00295 F736 48      MSG17   FCC     /HALT/
      F737 41
      F738 4C
      F739 54
00296 F73A 04              FCB     4
00297 F73B 50      MSG18   FCC     /PROT./
      F73C 52
      F73D 4F
      F73E 54
      F73F 2E
00298 F740 04              FCB     4
00299      F741   MSG19    EQU     *
00300 F741 41     MSG20    FCC     /ABORT/
      F742 42
      F743 4F
      F744 52
      F745 54
00301 F746 04              FCB     4

00303 F747 CE F741 PRNTS2  LDX     #MSG19
00304 F74A BD FC32         JSR     PDATA
00305 F74D 3F              SWI
00306 F74E 12              FCB     CCRLF
00307 F74F FE AC72         LDX     SP
00308 F752 08              INX
```

```
00309 F753 BD F855           JSR    OUT2HS
00310 F756 BD F855           JSR    OUT2HS
00311 F759 BD F855           JSR    OUT2HS
00312 F75C BD F853           JSR    OUT4HS
00313 F75F BD F853           JSR    OUT4HS
00314 F762 CE AC72           LDX    #SP
00315 F765 7E F853           JMP    OUT4HS
00317                  *
00318                  * THIS IS THE LOAD ROUTINE
00319                  *

00321 F768 86 80    LOAD     LDA A  #$80
00322 F76A B7 AC68           STA A  FLAG       PREVENT ECCOS
00323 F76D 86 11             LDA A  #$11
00324 F76F 3F               SWI
00325 F770 11                FCB    COUCH

00327 F771 BD F9B2 LOAD3     JSR    INEEE
00328 F774 25 65             BCS    LOAD22
00329 F776 81 53             CMP A  #'S
00330 F778 26 F7             BNE    LOAD3
00331 F77A BD F9B2           JSR    INEEE
00332 F77D 25 5C             BCS    LOAD22
00333 F77F 81 39             CMP A  #'9
00334 F781 27 2F             BEQ    LOAD21
00335 F783 81 31             CMP A  #'1
00336 F785 26 EA             BNE    LOAD3

00338 F787 7F AC69           CLR    CKSM
00339 F78A 8D 50             BSR    BYTE
00340 F78C 25 4D             BCS    C1
00341 F78E 80 02             SUB A  #2
00342 F790 B7 AC6A           STA A  BYTECT
00343 F793 8D 35             BSR    BADDA
00344 F795 25 44             BCS    C1

00346 F797 FF AC70 LOAD11    STX    TW
00347 F79A 8D 40             BSR    BYTE
00348 F79C 25 3D             BCS    C1
00349 F79E 7A AC6A           DEC    BYTECT
00350 F7A1 27 08             BEQ    LOAD15
00351 F7A3 FE AC70           LDX    TW
00352 F7A6 A7 00             STA A  X
00353 F7A8 08                INX
00354 F7A9 20 EC             BRA    LOAD11

00356 F7AB 7C AC69 LOAD15    INC    CKSM
00357 F7AE 27 C1             BEQ    LOAD3
00358 F7B0 0D                SEC
00359 F7B1 39                RTS

00361 F7B2 7F AC68 LOAD21    CLR    FLAG
00362 F7B5 0C                CLC
00363 F7B6 39                RTS

00365 F7B7 CE F6CA FROMTO    LDX    #MSG4
00366 F7BA BD FC32           JSR    PDATA
00367 F7BD 8D 0B             BSR    BADDA
00368 F7BF 25 1A             BCS    C1
00369 F7C1 FF AC6C           STX    BEGA
00370 F7C4 CE F6CE           LDX    #MSG5
00371 F7C7 BD FC32           JSR    PDATA

00373 F7CA 8D 10    BADDA    BSR    BYTE
00374 F7CC 25 0D             BCS    BADD01
```

```
00375 F7CE B7 AC70          STA A   XHI
00376 F7D1 8D 09            BSR     BYTE
00377 F7D3 25 06             BCS    BADDA1
00378 F7D5 B7 AC71          STA A   XLOW
00379 F7D8 FE AC70           LDX    XHI
00380      F7DB      LOAD22  EQU    *
00381      F7DB      C1      EQU    *
00382 F7DB 39        BADDA1  RTS

00384 F7DC 8D 27     BYTE    BSR    INHEX
00385 F7DE 25 FB             BCS    BADDA1
00386 F7E0 48                ASL A
00387 F7E1 48                ASL A
00388 F7E2 48                ASL A
00389 F7E3 48                ASL A
00390 F7E4 36                PSH A                SAVE FOR LATER
00391 F7E5 8D 1E             BSR    INHEX
00392 F7E7 33                PUL B                RESTORE PREVIOUS VALUE
00393 F7E8 25 F1             BCS    BADDA1
00394 F7EA 1B                ABA
00395 F7EB 16                TAB
00396 F7EC FB AC69           ADD B  CKSM
00397 F7EF F7 AC69           STA B  CKSM
00398 F7F2 0C        C1A     CLC
00399 F7F3 39                RTS

00401 F7F4 44        OUTHL   LSR A
00402 F7F5 44                LSR A
00403 F7F6 44                LSR A
00404 F7F7 44                LSR A

00406 F7F8 84 0F     OUTHR   AND A  #$F
00407 F7FA 8B 30             ADD A  #$30
00408 F7FC 81 39             CMP A  #$39
00409 F7FE 23 02             BLS    OUTCH
00410 F800 8B 07             ADD A  #7

00412 F802 3F        OUTCH   SWI
00413 F803 11                FCB    COUCH
00414 F804 39                RTS

00416 F805 BD F9B2   INHEX   JSR    INEEE
00417 F808 80 30     CHEX    SUB A  #$30
00418 F80A 25 0F             BCS    CHEX2
00419 F80C 8B E9             ADD A  #$E9
00420 F80E 25 0B             BCS    CHEX2
00421 F810 8B 06             ADD A  #6
00422 F812 2A 04             BPL    CHEX1
00423 F814 8B 07             ADD A  #7
00424 F816 25 03             BCS    CHEX2
00425 F818 8B 0A     CHEX1   ADD A  #10
00426 F81A 0C                CLC
00427 F81B 39        CHEX2   RTS

00429 F81C CE F6CA   CHANGE  LDX    #MSG4
00430 F81F BD FC34           JSR    PDATA1
00431 F822 8D A6             BSR    BADDA
00432 F824 CE F6C5   CHA51   LDX    #MSG3
00433 F827 BD FC34           JSR    PDATA1
00434 F82A CE AC70           LDX    #XHI
00435 F82D 8D 24             BSR    OUT4HS
00436 F82F FE AC70           LDX    XHI
00437 F832 8D 21             BSR    OUT2HS
00438 F834 FF AC70           STX    XHI
00439 F837 3F                SWI
```

```
00440 F838 10              FCB     CINCH
00441 F839 81 20            CMP A   #$20
00442 F83B 26 E7            BNE     CHA51
00443 F83D 8D 9D            BSR     BYTE
00444 F83F 25 1A            BCS     C2
00445 F841 09               DEX
00446 F842 A7 00            STA A   X
00447 F844 A1 00            CMP A   X
00448 F846 27 DC            BEQ     CHA51
00449 F848 20 11            BRA     C2

00451 F84A A6 00    OUT2H   LDA A   X
00452 F84C 8D A6            BSR     OUTHL
00453 F84E A6 00            LDA A   X
00454 F850 08               INX
00455 F851 20 A5            BRA     OUTHR

00457 F853 8D F5    OUT4HS  BSR     OUT2H
00458 F855 8D F3    OUT2HS  BSR     OUT2H
00459 F857 86 20    OUTSP   LDA A   #$20
00460 F859 20 A7            BRA     OUTCH
00463 F85B 20 69    C2      BRA     C2A

00465 F85D BD F7B7  PUNCH   JSR     FROMTO
00466 F860 25 F9            BCS     C2
00467 F862 FF AC6E          STX     ENDA

00469 F865 86 12            LDA A   #$12    TURN ON PUNCH
00470 F867 8D 99            BSR     OUTCH

00472 F869 8D 5D            BSR     LEADR
00473 F86B FE AC6C          LDX     BEGA
00474 F86E FF AC70          STX     TW
00475 F871 B6 AC6F  PUN11   LDA A   ENDA+1
00476 F874 B0 AC71          SUB A   TW+1
00477 F877 F6 AC6E          LDA B   ENDA
00478 F87A F2 AC70          SBC B   TW
00479 F87D 26 04            BNE     PUN22
00480 F87F 81 10            CMP A   #16
00481 F881 25 02            BCS     PUN23
00482 F883 86 0F    PUN22   LDA A   #15
00483 F885 9B 04    PUN23   ADD A   #4
00484 F887 B7 AC6A          STA A   BYTECT
00485 F88A 80 03            SUB A   #3
00486 F88C B7 AC6B          STA A   TEMP
00487 F88F CE F6C2          LDX     #MSG1
00488 F892 BD FC32          JSR     PDATA
00489 F895 5F               CLR B
00490 F896 CE AC6A          LDX     #BYTECT
00491 F899 8D 37            BSR     PUNT2
00492 F89B CE AC70          LDX     #TW
00493 F89E 8D 32            BSR     PUNT2
00494 F8A0 8D 30            BSR     PUNT2
00495 F8A2 FE AC70          LDX     TW

00497 F8A5 8D 2B    PUN32   BSR     PUNT2
00498 F8A7 7A AC6B          DEC     TEMP
00499 F8AA 26 F9            BNE     PUN32
00500 F8AC FF AC70          STX     TW
00501 F8AF 53               COM B
00502 F8B0 37               PSH B
00503 F8B1 30               TSX
00504 F8B2 8D 1E            BSR     PUNT2
00505 F8B4 33               PUL B
00506 F8B5 FE AC70          LDX     TW
```

```
00507 F8B8 09              DEX
00508 F8B9 BC AC6E         CPX     ENDA
00509 F8BC 26 B3            BNE     PUN11
00510 F8BE CE F6E0          LDX     #MSG8
00511 F8C1 BD FC32          JSR     PDATA
00512 F8C4 8D 02            BSR     LEADR
00513 F8C6 20 7D    C2A     BRA     CONTRL

00515 F8C8 C6 32    LEADR   LDA B   #50
00516 F8CA 4F               CLR A
00517 F8CB BD F802  LEAD1   JSR     OUTCH
00518 F8CE 5A               DEC B
00519 F8CF 26 FA            BNE     LEAD1
00520 F8D1 39               RTS

00522 F8D2 EB 00    PUNT2   ADD B   X
00523 F8D4 7E F84A          JMP     OUT2H
00525                *
00526                * THIS IS THE ENTRY
00527                *

00529 F8D7 86 FF    POWER   LDA A   #$FF
00530 F8D9 B7 AA14          STA A   DKDID+4   STOP KLICKER
00531 F8DC 86 04            LDA A   #4
00532 F8DE B7 AA15          STA A   DKDID+5
00533 F8E1 B6 AA14          LDA A   DKDID+4   STOP INTERUPT
00534 F8E4 CE F66B          LDX     #SWISVX
00535 F8E7 FF ACB2          STX     XSWIPR
00536 F8EA CE FC96          LDX     #NMISVX
00537 F8ED FF ACB4          STX     XNMIPR
00538 F8F0 8E AC60          LDS     #STACK
00539 F8F3 BF AC72          STS     SP
00540 F8F6 C6 03            LDA B   #3
00541 F8F8 86 01            LDA A   #1
00542 F8FA CE AC81          LDX     #PPNTF    SET UP PARTITIONS
00543 F8FD FF ACB0          STX     PPOINT
00544 F900 A7 00            STA A   X
00545 F902 08               INX
00546 F903 6F 00            CLR     X
00547 F905 8C ACAF          CPX     #SPEND
00548 F908 26 F8            BNE     *-6
00549 F90A B7 AC9D          STA A   PHASE     SET PHASE TO 1 SO NEXT IS ZER
00550 F90D CE AB80          LDX     #TTYS
00551 F910 E7 00            STA B   0,X       RESET PORT
00552 F912 A7 00            STA A   X
00553 F914 FF AC86          STX     PPNTF+5   SAVE IT
00554 F917 7F ACB6          CLR     UNIT0
00555 F91A B7 ACB7          STA A   UNIT0A
00556 F91D 7F ACD1          CLR     UNIT1
00557 F920 B7 ACD2          STA A   UNIT1A
00558 F923 7F ACEC          CLR     UNIT2
00559 F926 B7 ACED          STA A   UNIT2A
00560 F929 7F AD07          CLR     UNIT3
00561 F92C B7 AD08          STA A   UNIT3A
00562                *
00563                * AT THIS POINT WE SEE IF IPL OF PARTITIONS IS REQUI
00564                *

00566 F92F FE 4000          LDX     $4000
00567 F932 8C 55AA          CPX     #$55AA
00568 F935 26 05            BNE     POWER1
00569 F937 FE 4002          LDX     $4002
00570 F93A AD 00            JSR     X         GO IPL PABX
00571 F93C BD FD74  POWER1  JSR     LINK
```

```
00572 F93F CE F6EB         LDX    #MSG9
00573 F942 BD FC32         JSR    PDATA

00575 F945 8E AC60  CONTRL LDS    #STACK
00576 F948 7F AC68         CLR    FLAG
00577 F94B CE F6C5         LDX    #MSG3
00578 F94E BD FC34         JSR    PDATA1
00579 F951 8D 5F           BSR    INEEE
00580 F953 16              TAB
00581 F954 BD F857         JSR    OUTSP
00582 F957 C1 4C           CMP  B #'L
00583 F959 26 03           BNE    *+5
00584 F95B BD F768         JSR    LOAD
00585 F95E C1 4D           CMP  B #'M
00586 F960 26 03           BNE    *+5
00587 F962 7E F81C         JMP    CHANGE
00588 F965 C1 50           CMP  B #'P
00589 F967 26 03           BNE    *+5
00590 F969 7E F85D         JMP    PUNCH
00591 F96C C1 47           CMP  B #'G
00592 F96E 26 03           BNE    *+5
00593 F970 7E FB32         JMP    GOGO
00594 F973 C1 54           CMP  B #'T
00595 F975 26 03           BNE    *+5
00596 F977 7E FB83         JMP    PTIME
00597 F97A C1 53           CMP  B #'S
00598 F97C 26 03           BNE    *+5
00599 F97E 7E FB3E         JMP    CTIME
00600 F981 C1 41           CMP  B #'A
00601 F983 26 03           BNE    *+5
00602 F985 7E F9F2         JMP    PPARTS
00603 F988 C1 44           CMP  B #'D
00604 F98A 26 03           BNE    *+5
00605 F98C 7E FA34         JMP    DISPLA
00606 F98F C1 42           CMP  B #'B
00607 F991 26 03           BNE    *+5
00608 F993 7E FADD         JMP    BEGAN
00609 F996 C1 43           CMP  B #'C
00610 F998 26 03           BNE    *+5
00611 F99A 7E FA91         JMP    CONTPN
00612 F99D C1 48           CMP  B #'H
00613 F99F 26 03           BNE    *+5
00614 F9A1 7E FA9C         JMP    HALTPN
00615 F9A4 C1 46           CMP  B #'F      SEE IF FILE LOAD
00616 F9A6 26 02           BNE    *+4
00617 F9A8 3F              SWI
00618 F9A9 00              FCB    0

00620 F9AA C1 52           CMP  B #'R
00621 F9AC 26 02           BNE    *+4
00622 F9AE 8D 3F    PRNTS  BSR    PRNTS1
00623 F9B0 20 93           BRA    CONTRL
00625                *
00626                * THIS IS THE INPUT / OUTPUT ROUTINE
00627                *

00629 F9B2 B6 AC68  INEEE  LDA  A FLAG
00630 F9B5 44              LSR  A
00631 F9B6 24 03           BCC    INEEE1
00632 F9B8 7E FE37         JMP    RIX
00633 F9BB 3F       INEEE1 SWI
00634 F9BC 0F              FCB    CINNE
00635 F9BD 84 7F    INEEE2 AND  A #$7F
00636 F9BF 81 7F           CMP  A #$7F
00637 F9C1 27 EF           BEQ    INEEE
```

```
00638 F9C3 7D AC68           TST     FLAG
00639 F9C6 2A 01             BPL     OUTEEE
00640 F9C8 39                RTS

00642 F9C9 3F        OUTEEE  SWI
00643 F9CA 11                FCB     COUCH
00644 F9CB 39                RTS
00646 F9CC BF AC72  SFE      STS     SP

00648                *
00649                * NOW ABORT PARTITION
00650                *
00651 F9CF FE ACB0           LDX     PPOINT    GET PARTITION POINTER
00652 F9D2 A6 00             LDA A   X         SEE IF PROTECTED
00653 F9D4 81 01             CMP A   #1
00654 F9D6 27 0F             BEQ     SFE1
00655 F9D8 CE F741           LDX     #MSG20
00656 F9DB BD FC32           JSR     PDATA
00657 F9DE 8D 0F             BSR     PRNTS1
00658 F9E0 FE ACB0  SFE0     LDX     PPOINT
00659 F9E3 6F 00             CLR     X         ABORT PARTITION
00660 F9E5 20 05             BRA     SFE2

00662 F9E7 8C AC81  SFE1     CPX     #PPNTF    SEE IF TBUG LEVEL
00663 F9EA 27 C2             BEQ     PRNTS
00664 F9EC 7E FCAF  SFE2     JMP     PIDLE0    NO WAIT SOME TIME

00666                *
00667                * PRINT TARGET
00668                *

00670 F9EF 7E F747  PRNTS1   JMP     PRNTS2    RELOCATED ROUTINE

00672                *
00673                * THIS IS THE PARTITION PRINT ROUTINE
00674                *

00676       F9F2    PPARTS  EQU     *
00677 F9F2 CE F6F4           LDX     #MSG10    P#  ADDP SS SPNOW
00678 F9F5 BD FC32           JSR     PDATA
00679 F9F8 86 30             LDA A   #'0
00680 F9FA B7 AC68           STA A   FLAG
00681 F9FD CE AC81           LDX     #PPNTF    FIRST PARTITION
00682 FA00 FF AC70  PPART1   STX     TW
00683 FA03 CE F70F           LDX     #MSG11
00684 FA06 BD FC32           JSR     PDATA
00685 FA09 B6 AC68           LDA A   FLAG
00686 FA0C 3F                SWI
00687 FA0D 11                FCB     COUCH
00688 FA0E BD F857           JSR     OUTSP
00689 FA11 BD F857           JSR     OUTSP
00690 FA14 7C AC68           INC     FLAG
00691 FA17 CE AC70           LDX     #TW
00692 FA1A BD F853           JSR     OUT4HS
00693 FA1D FE AC70           LDX     TW
00694 FA20 BD F855           JSR     OUT2HS
00695 FA23 BD F853           JSR     OUT4HS    PRINT STACK
00696 FA26 BD F853           JSR     OUT4HS    PRINT XSAVE
00697 FA29 BD F853           JSR     OUT4HS    PRINT IOADDN
00698 FA2C 8C AC9D           CPX     #PPNTL    SEE IF END
00699 FA2F 26 CF             BNE     PPART1    NO CONTINUE
00701 FA31 7E F945  C3       JMP     CONTRL
00703                *
00704                * THIS IS THE DESPLAY ROUTINE
00705                *
```

```
00707 FA34 BD F7B7 DISPLA  JSR     FROMIO
00708 FA37 25 F8           BCS     C3
00709 FA39 08               INX
00710 FA3A FF AC6E          STX     ENDA

00712 FA3D 3F       DISP1   SWI
00713 FA3E 12               FCB     CCRLF
00714 FA3F CE AC6C          LDX     #BEGA
00715 FA42 BD F853          JSR     OUT4HS
00716 FA45 C6 10            LDA B   #16
00717 FA47 FE AC6C          LDX     BEGA
00718 FA4A FF AC70          STX     TW

00720 FA4D BD F855 DISP2    JSR     OUT2HS
00721 FA50 FF AC6C          STX     BEGA
00722 FA53 BC AC6E          CPX     ENDA
00723 FA56 27 10            BEQ     DISP10
00724 FA58 5A               DEC B
00725 FA59 27 09            BEQ     DISP3
00726 FA5B C1 08            CMP B   #8
00727 FA5D 26 EE            BNE     DISP2
00728 FA5F BD F857          JSR     OUTSP
00729 FA62 20 E9            BRA     DISP2

00731 FA64 8D 06   DISP3    BSR     DISP4
00732 FA66 20 D5            BRA     DISP1

00734 FA68 8D 02   DISP10   BSR     DISP4
00735 FA6A 20 C5            BRA     C3
00736 FA6C BD F857 DISP4    JSR     OUTSP
00737 FA6F 86 2A            LDA A   #'*
00738 FA71 3F               SWI
00739 FA72 11               FCB     COUCH
00740 FA73 FE AC70          LDX     TW
00741 FA76 A6 00   DISP6    LDA A   X
00742 FA78 81 20            CMP A   #'
00743 FA7A 2D 11            BLT     DISP7
00744 FA7C 81 60            CMP A   #$60
00745 FA7E 2C 0D            BGE     DISP7
00746 FA80 3F     DISP8     SWI
00747 FA81 11               FCB     COUCH
00748 FA82 08               INX
00749 FA83 BC AC6C          CPX     BEGA
00750 FA86 26 EE            BNE     DISP6
00751 FA88 86 2A            LDA A   #'*
00752 FA8A 3F               SWI
00753 FA8B 11               FCB     COUCH
00754 FA8C 39               RTS
00755 FA8D 86 2E   DISP7    LDA A   #'.
00756 FA8F 20 EF            BRA     DISP8
00758                *
00759                * THIS IS THE HALT END AND CONTINUE
00760                *

00762 FA91 8D 25   CONTPN   BSR     GETPN
00763 FA93 25 17            BCS     C41
00764 FA95 6D 00            TST     X
00765 FA97 26 4C            BNE     BEGAN1
00766 FA99 7E FB25          JMP     BEGAN3   SET UP RUN

00768 FA9C 8D 1A   HALTPN   BSR     GETPN
00769 FA9E 25 0C            BCS     C41
00770 FAA0 A6 00            LDA A   X
00771 FAA2 81 01            CMP A   #1       SEE IF PROTECTED PROGRAM
```

```
00772 FAA4 26 08              BNE     HALTP1
00773 FAA6 CE F73B            LDX     #MSG18
00774 FAA9 BD FC32            JSR     PDATA
00775 FAAC 20 08      C41     BRA     C42
00776 FAAE 6F 00      HALTP1  CLR     X
00777 FAB0 CE F736            LDX     #MSG17
00778 FAB3 BD FC32            JSR     PDATA
00779 FAB6 20 77      C42     BRA     C4
00781                 *
00782                 * THIS IS A SUB ROUTINE TO FIND P NUMBER
00783                 *

00785 FAB8 CE F711   GETPN    LDX     #MSG12
00786 FABB BD FC32            JSR     PDATA
00787 FABE BD F805            JSR     INHEX
00788 FAC1 25 19              BCS     GETPN9      EXIT BADD
00789 FAC3 85 FC              BIT A   #$FC        IF OVER 3 BAD
00790 FAC5 26 68              BNE     C4          EXIT BAD
00791 FAC7 16               TAB
00792 FAC8 48               ASL A
00793 FAC9 1B               ABA
00794 FACA 48               ASL A                 TIMES 6
00795 FACB 1B               ABA                   TIMES 7
00796 FACC CE AC81            LDX     #PPNTF
00797 FACF FF AC6C            STX     BEGA
00798 FAD2 BB AC6D            ADD A   BEGA+1
00799 FAD5 B7 AC6D            STA A   BEGA+1
00800 FAD8 FE AC6C            LDX     BEGA
00801 FADB 0C                 CLC
00802 FADC 39       GETPN9    RTS

00804 FADD 8D D9    BEGAN     BSR     GETPN
00805 FADF 25 4E              BCS     C4          ERROR RETURN
00806 FAE1 A6 00              LDA A   X           SEE IF IDLE
00807 FAE3 27 08              BEQ     BEGAN2
00808 FAE5 CE F72D BEGAN1     LDX     #MSG16
00809 FAE8 BD FC32            JSR     PDATA
00810 FAEB 20 42              BRA     C4
00811 FAED CE F716 BEGAN2     LDX     #MSG13      GET STARTING ADDRESS
00812 FAF0 BD FC32            JSR     PDATA
00813 FAF3 BD F7CA            JSR     BADDA
00814 FAF6 25 37              BCS     C4
00815 FAF8 FF AC3B            STX     PCNP
00816 FAFB CE F71B            LDX     #MSG14      GET IO ADDRESS
00817 FAFE BD FC32            JSR     PDATA
00818 FB01 FE AC6C            LDX     BEGA
00819 FB04 BD F7DC            JSR     BYTE
00820 FB07 25 26              BCS     C4
00821 FB09 A7 05              STA A   5,X
00822 FB0B BD F7DC            JSR     BYTE
00823 FB0E 25 1F              BCS     C4
00824 FB10 A7 06              STA A   6,X
00825 FB12 CE AC2F            LDX     #ASP
00826 FB15 FF AC6E            STX     ENDA
00827 FB18 FE AC6C            LDX     BEGA
00828 FB1B B6 AC6E            LDA A   ENDA
00829 FB1E A7 01              STA A   1,X
00830 FB20 B6 AC6F            LDA A   ENDA+1
00831 FB23 A7 02              STA A   2,X
00832 FB25 86 02    BEGAN3    LDA A   #2
00833 FB27 A7 00              STA A   X
00834 FB29 CE F720            LDX     #MSG15
00835 FB2C BD FC32            JSR     PDATA

00837 FB2F 7E F945  C4        JMP     CONTRL
```

```
00839                *
00840                * THIS IS THE GO GO ROUTINE
00841                *

00843 FB32 BD F7CA GOGO   JSR   BADDA
00844 FB35 24 03          BCC   *+5
00845 FB37 7E F945        JMP   CONTRL
00846 FB3A FF AC66        STX   GOPC
00847 FB3D 3B             RTI
00849                *
00850                * THIS IS THE CHANGE TIME ROUTINE
00851                *

00853 FB3E CE F6D2 CTIME  LDX   #MSG6
00854 FB41 BD FC34        JSR   PDATA1
00855 FB44 BD F7DC        JSR   BYTE
00856 FB47 25 37          BCS   CTIME1
00857 FB49 B7 AC79        STA A KHR
00858 FB4C BD F7DC        JSR   BYTE
00859 FB4F 25 2F          BCS   CTIME1
00860 FB51 B7 AC78        STA A KMIN
00861 FB54 BD F7DC        JSR   BYTE
00862 FB57 25 27          BCS   CTIME1
00863 FB59 B7 AC77        STA A KSEC
00864 FB5C CE F6D8        LDX   #MSG7
00865 FB5F BD FC34        JSR   PDATA1
00866 FB62 BD F7DC        JSR   BYTE
00867 FB65 25 19          BCS   CTIME1
00868 FB67 B7 AC7B        STA A KMO
00869 FB6A BD F7DC        JSR   BYTE
00870 FB6D 25 11          BCS   CTIME1
00871 FB6F B7 AC7A        STA A KDAY
00872 FB72 BD F7DC        JSR   BYTE
00873 FB75 25 09          BCS   CTIME1
00874 FB77 B7 AC7C        STA A KYEAR
00875 FB7A B6 AC7B        LDA A KMO
00876 FB7D BD FD15        JSR   CALLD
00877 FB80 7E F945 CTIME1 JMP   CONTRL

00879                *
00880                * THIS IS THE DISPLAY TIME REQ
00881                *

00883 FB83 8D 02   PTIME  BSR   PTIME1
00884 FB85 20 F9          BRA   CTIME1

00886 FB87 CE F6D2 PTIME1 LDX   #MSG6
00887 FB8A BD FC34        JSR   PDATA1
00888 FB8D CE AC79        LDX   #KHR
00889 FB90 BD F855        JSR   OUT2HS
00890 FB93 09             DEX
00891 FB94 09             DEX
00892 FB95 BD F855        JSR   OUT2HS
00893 FB98 09             DEX
00894 FB99 09             DEX
00895 FB9A BD F855        JSR   OUT2HS
00896 FB9D CE F6D8        LDX   #MSG7
00897 FBA0 BD FC34        JSR   PDATA1
00898 FBA3 CE AC7B        LDX   #KMO
00899 FBA6 BD F855        JSR   OUT2HS
00900 FBA9 CE AC7A        LDX   #KDAY
00901 FBAC BD F855        JSR   OUT2HS
00902 FBAF CE AC7C        LDX   #KYEAR
00903 FBB2 BD F855        JSR   OUT2HS
00904 FBB5 39             RTS
```

```
00907                *
00908                * THIS IS THE COMMON I/O ROUTINE
00909                *

00911 FBB6 3F        CRLFIS SWI
00912 FBB7 12               FCB    CCRLF
00913 FBB8 5F        IS     CLR B
00914 FBB9 3F        IS1    SWI
00915 FBBA 0F               FCB    CINNE
00916 FBBB 84 7F            AND A  #$7F
00917 FBBD 81 7F            CMP A  #$7F    SEE IF BACK SPACE
00918 FBBF 27 12            BEQ    IS3
00919 FBC1 81 0A            CMP A  #10     SEE IF LINE FEED
00920 FBC3 27 F1            BEQ    CRLFIS
00921 FBC5 A7 00            STA A  X
00922 FBC7 81 0D            CMP A  #$D     SEE IF CR
00923 FBC9 27 11            BEQ    IS4     END NORMAL
00924 FBCB 08               INX
00925 FBCC 5C               INC B
00926 FBCD 2B 11            BMI    IS5     LINE TO LONG
00927 FBCF 3F        IS2    SWI
00928 FBD0 11               FCB    COUCH   OUTPUT
00929 FBD1 20 E6            BRA    IS1

00931 FBD3 5D        IS3    TST B
00932 FBD4 27 0A            BEQ    IS5     BAD EXIT
00933 FBD6 5A               DEC B
00934 FBD7 09               DEX
00935 FBD8 A6 00            LDA A  X
00936 FBDA 20 F3            BRA    IS2
00937 FBDC 3F        IS4    SWI
00938 FBDD 12               FCB    CCRLF
00939 FBDE 0C               CLC
00940 FBDF 39               RTS
00941 FBE0 0D        IS5    SEC
00942 FBE1 39               RTS

00944 FBE2 FE ACB0  XNNOEC LDX    PPOINT
00945 FBE5 EE 05            LDX    5,X     GET IO NUMBER
00946 FBE7 A6 00    INNOE0 LDA A  X       GET SNERIAL STATUS
00947 FBE9 47               ASR A          SHIFT RECEIVE BIT TO CARY
00948 FBEA 24 FB            BCC    INNOE0
00949 FBEC A6 01    INNOE1 LDA A  1,X     GET DATA
00950 FBEE 20 57            BRA    STATU2

00952 FBF0 8D F0    XNPUT  BSR    XNNOEC  INPUT NO ECCO

00954 FBF2 FE ACB0  XUTPUT LDX    PPOINT
00955 FBF5 EE 05            LDX    5,X
00956 FBF7 8D 2A            BSR    OUTP99
00957 FBF9 81 0D            CMP A  #13     SEE IF CR
00958 FBFB 26 24            BNE    OUTP98
00959 FBFD 36               PSH A
00960 FBFE 4F               CLR A
00961 FBFF 37               PSH B
00962 FC00 C6 04            LDA B  #4
00963 FC02 8D 1F    OUTP97 BSR    OUTP99
00964 FC04 5A               DEC B
00965 FC05 26 FB            BNE    OUTP97
00966 FC07 86 0A            LDA A  #10
00967 FC09 33               PUL B
00968 FC0A 8D 17            BSR    OUTP99
00969 FC0C A6 01    OUT98B LDA A  1,X
00970 FC0E 81 17            CMP A  #$17
00971 FC10 27 FA            BEQ    OUT98B
```

```
00972 FC12 81 1A            CMP A   #$1A
00973 FC14 26 03            BNE     OUT98C
00974 FC16 7E E836          JMP     $E836
00975 FC19 81 18   OUT98C   CMP A   #$18
00976 FC1B 26 03            BNE     OUT98D
00977 FC1D 7E F945          JMP     CONTRL
00978 FC20 32     OUT98D   PUL A
00979 FC21 20 24  OUTP98   BRA     STATU2

00981 FC23 36     OUTP99   PSH A
00982 FC24 A6 00  OUT99A   LDA A   X
00983 FC26 85 02           BIT A   #2
00984 FC28 27 FA           BEQ     OUT99A
00985 FC2A 32     OUT99B   PUL A
00986 FC2B A7 01           STA A   1,X
00987 FC2D 39             RTS

00989 FC2E 86 0D  XRLF     LDA A   #$D
00990 FC30 20 C0           BRA     XUTPUT

00992 FC32 3F     PDATA    SWI
00993 FC33 12              FCB     CCRLF    DO CRLF FIRST
00994 FC34 A6 00  PDATA1   LDA A   X        GET DATA
00995 FC36 08              INX
00996 FC37 81 04           CMP A   #4       SEE IF END
00997 FC39 26 01           BNE     *+3
00998 FC3B 39              RTS
00999 FC3C 3F              SWI
01000 FC3D 11              FCB     COUCH
01001 FC3E 20 F4           BRA     PDATA1

01003 FC40 FE ACB0 XTATUS  LDX     PPOINT
01004 FC43 EE 05           LDX     5,X
01005 FC45 A6 00  STATU1   LDA A   X
01006 FC47 FE ACB0 STATU2  LDX     PPOINT
01007 FC4A EE 03           LDX     3,X      RESTORE X REG
01008 FC4C 39              RTS

01010 FC4D FE ACB0 XODE    LDX     PPOINT
01011 FC50 EE 05           LDX     5,X
01012 FC52 A7 00           STA A   X        SET MODE
01013 FC54 20 F1           BRA     STATU2
01015 FC56 FE ACB0 XUMP2   LDX     PPOINT
01016 FC59 EE 05           LDX     5,X
01017 FC5B 08              INX
01018 FC5C A6 00           LDA A   X        DUMP DATA
01019 FC5E 20 E5           BRA     STATU1

01021 FC60 FE ACB0 SETIO   LDX     PPOINT
01022 FC63 A6 03           LDA A   3,X
01023 FC65 E6 04           LDA B   4,X
01024 FC67 A7 05           STA A   5,X
01025 FC69 E7 06           STA B   6,X
01026 FC6B 39              RTS
01028                    * THE IRQ VECTOR IS SOME TIMES
01029                    * FALSE BECAUSE OF TIMMING PROBLEMS
01030                    * IN THE 6800 CHIP IF A NMI OCCURED
01031                    * WELL A SWI WAS ALSO IN
01032                    * PROGRESS SO A SOFTWARE PATCH
01033                    * IS NESSARY IF SWI INTRUCTION IS
01034                    * EXECUTED FOR PROPER RECOVERY
01035                    *

01037 FC6C 30     IRQSVC   TSX              MAKE X = STACK POINTER+1
01038 FC6D EE 05           LDX     5,X      GET PROGRAM COUNTER
```

```
01039 FC6F 09                    DEX
01040 FC70 A6 00                 LDA A   X
01041 FC72 81 3F                 CMP A   #$3F       SEE IF SWI INS
01042 FC74 27 12                 BEQ     IRQSV1     NO NORMAL IO INT HANDLER
01043 FC76 FE ACA4                LDX     PGMFLG+4   IRQ ENTRY
01044 FC79 27 03                 BEQ     IRQSV2     ABORT
01045 FC7B AD 00                 JSR     0,X
01046 FC7D 3B                    RTI
01047 FC7E 30        IRQSV2      TSX
01048 FC7F 86 10                 LDA A   #$10
01049 FC81 AA 00                 ORA A   0,X
01050 FC83 A7 00                 STA A   0,X
01051 FC85 7E F9E0                JMP     $FE0       ABORT THIS PARTITION

01053                  *
01054                  * AT THIS POINT A NMI OCCURED DURN A SWI
01055                  * SO MODIFY THE RETURN POINTER TO INDICATE
01056                  * THAT THE SWI IS TO BE RE-EXCUTED
01057                  *

01059 FC88 30        IRQSV1      TSX
01060 FC89 6D 06                 TST     6,X        LOW BYTE = 0
01061 FC8B 26 02                 BNE     *+4
01062 FC8D 6A 05                 DEC     5,X
01063 FC8F 6A 06                 DEC     6,X

01065                  *
01066                  * THIS IS THE NORMAL NMI ENTRY
01067                  *

01069 FC91 FE ACB4  NMISVC LDX    XNMIPR
01070 FC94 6E 00                 JMP     0,X
01071 FC96 7A AC7E  NMISVX DEC    XSEC       SEE IF SECOND HAS PASSED
01072 FC99 26 0A                 BNE     NMISV1     NO CONTINUE
01073 FC9B 86 32                 LDA A   #50        RESET SECOND COUNTER
01074 FC9D B7 AC7E               STA A   XSEC
01075 FCA0 8D 4D                 BSR     TIME       UPDATE CLOCK
01076 FCA2 B7 AC7D               STA A   SECF

01078 FCA5 CE 55AA  NMISV1 LDX    #$55AA     CODE KEY FOR VALID PABX PGM
01079 FCA8 BC ACA0               CPX     PGMFLG
01080 FCAB 26 02                 BNE     PIDLE0
01081 FCAD 8D 25                 BSR     I20MSK     CHECK AND BRANCH
01083 FCAF FE ACB0  PIDLE0 LDX    PPOINT     GET PARTITION POINTER
01084 FCB2 AF 01                 STS     1,X        SAVE THE STACK INFO
01085 FCB4 08        PIDLE       INX
01086 FCB5 08                    INX
01087 FCB6 08                    INX
01088 FCB7 08                    INX
01089 FCB8 08                    INX
01090 FCB9 08                    INX
01091 FCBA 08                    INX
01092 FCBB 8C AC9D               CPX     #PPNTL     SEE IF END OF PARTITIONS
01093 FCBE 26 07                 BNE     PIDLE3
01094 FCC0 CE AC81               LDX     #PPNTF     LAST SET FIRST
01095 FCC3 6D 00                 TST     X          SEE IF FIRST OPERATIONAL
01096 FCC5 27 0A                 BEQ     PIDLE4     SOMPTING IS WRONG
01097 FCC7 AE 01   PIDLE3 LDS    1,X        GET NEXT STACK POINTER
01098 FCC9 6D 00                 TST     X          SEE IF PARTITION IDLE
01099 FCCB 27 E7                 BEQ     PIDLE      THIS PARTITION IS IDLE NEXT
01100 FCCD FF ACB0               STX     PPOINT     SET NEW PARTITION ADDRESS IN

01102 FCD0 3B                    RTI                RETURN FROM INTERUPT

01104 FCD1 7E F8D7  PIDLE4 JMP    POWER
```

```
01106 FCD4 CE ACA6  I20MSK  LDX     #PHASEP
01107 FCD7 7A AC9D          DEC     PHASE
01108 FCDA 26 07             BNE    PHASE0
01109 FCDC 86 05             LDA A  #5
01110 FCDE B7 AC9D           STA A  PHASE
01111 FCE1 20 08             BRA    PHASE2

01113 FCE3 B6 AC9D  PHASE0  LDA A   PHASE
01114 FCE6 08       PHASE1  INX
01115 FCE7 08               INX
01116 FCE8 4A               DEC A
01117 FCE9 26 FB             BNE    PHASE1
01118 FCEB EE 00   PHASE2   LDX     X
01119 FCED 6E 00            JMP     X
01121                  *
01122                  * THIS IS THE REAL TIME CLOCK ROUTINE
01123                  * THIS IS THE TIME / DATE UPDATE ROUTINE
01124                  *

01126 FCEF CE AC77  TIME    LDX     #KSEC
01127 FCF2 C6 60             LDA B  #$60    SEC / MIN LIMIT
01128 FCF4 8D 53             BSR    ADDTST
01129 FCF6 24 26             BCC    TIMEE
01130 FCF8 08               INX
01131 FCF9 8D 4E             BSR    ADDTST
01132 FCFB 24 21             BCC    TIMEE
01133 FCFD 08               INX
01134 FCFE C6 24             LDA B  #$24
01135 FD00 8D 47             BSR    ADDTST
01136 FD02 24 1A             BCC    TIMEE

01138                  *
01139                  * UPDATE DATE
01140                  *

01142 FD04 08               INX
01143 FD05 F6 AC76           LDA B  DAYLIM
01144 FD08 8D 3F             BSR    ADDTST
01145 FD0A 24 0F             BCC    DATEE
01146 FD0C 6C 00             INC    X
01147 FD0E 08               INX
01148 FD0F C6 13             LDA B  #$13
01149 FD11 8D 36             BSR    ADDTST
01150 FD13 25 0C             BCS    DATE1
01151      FD15   CALDAY EQU *
01152 FD15 81 02   CALLD    CMP A   #2
01153 FD17 26 0F            BNE     DATE2
01154 FD19 8D 3E            BSR     LEAPY
01155 FD1B 86 FF   DATEE    LDA A   #$FF
01156 FD1D 39              RTS
01157 FD1E 86 FD   TIMEE    LDA A   #$FD
01158 FD20 39              RTS

01160 FD21 6C 00   DATE1    INC     X
01161 FD23 08              INX
01162 FD24 8D 23            BSR     ADDTST
01163 FD26 A7 00            STA A   X
01164 FD28 B6 AC7B  DATE2   LDA A   KMO
01165 FD2B CE F723          LDX     #JAN-1
01166 FD2E FF AC74          STX     ISOFTP
01167 FD31 BB AC75          ADD A   ISOFTP+1
01168 FD34 B7 AC75          STA A   ISOFTP+1
01169 FD37 86 00            LDA A   #0
01170 FD39 B9 AC74          ADC A   ISOFTP
01171 FD3C B7 AC74          STA A   ISOFTP
```

```
01172 FD3F FE AC74          LDX     ISOFTP
01173 FD42 A6 00             LDA A   X
01174 FD44 B7 AC76           STA A   DAYLIM
01175 FD47 20 D2             BRA     DATEE

01177 FD49 A6 00    ADDTST   LDA A   X
01178 FD4B 8B 01             ADD A   #1
01179 FD4D 19                DAA
01180 FD4E A7 00             STA A   X
01181 FD50 11                CBA
01182 FD51 2C 02             BGE     ADDTS1
01183 FD53 0C                CLC
01184 FD54 39                RTS
01185 FD55 6F 00    ADDTS1   CLR     X
01186 FD57 0D                SEC
01187 FD58 39                RTS

01189 FD59 B6 AC7C  LEAPY    LDA A   KYEAR
01190 FD5C B7 AC76  LEAP1    STA A   DAYLIM
01191 FD5F 86 95             LDA A   #$95
01192 FD61 0D                SEC
01193 FD62 B9 AC76           ADC A   DAYLIM
01194 FD65 19                DAA
01195 FD66 27 08             BEQ     LEAP3
01196 FD68 2A F2             BPL     LEAP1
01197 FD6A 86 29             LDA A   #$29
01198 FD6C B7 AC76  LEAP2    STA A   DAYLIM
01199 FD6F 39                RTS
01200 FD70 86 30    LEAP3    LDA A   #$30
01201 FD72 20 F8             BRA     LEAP2
01203                    *
01204                    * THIS IS THE LINK
01205                    *

01207 FD74 86 81    LINK     LDA A   #$81
01208 FD76 FE ACB0           LDX     PPOINT
01209 FD79 A7 00             STA A   0,X
01210 FD7B BD FDD8           JSR     RESET
01211 FD7E 24 15             BCC     LINK1
01212 FD80 CE AD22  LINK8    LDX     #ENDSPR
01213 FD83 86 3F             LDA A   #$3F
01214 FD85 A7 00    LINK0    STA A   0,X
01215 FD87 08                INX
01216 FD88 8C AD49           CPX     #ENDSPR+39
01217 FD8B 26 F8             BNE     LINK0
01218 FD8D FE ACB0  LINK9    LDX     PPOINT
01219 FD90 86 01             LDA A   #1
01220 FD92 A7 00             STA A   0,X
01221 FD94 39                RTS
01222 FD95 86 04    LINK1    LDA A   #4
01223 FD97 7F AC7F           CLR     FLAG1
01224 FD9A 7F AC07           CLR     ICNTR
01225 FD9D 7F AC05           CLR     ITRK
01226 FDA0 7F AC06           CLR     ISCTR
01227 FDA3 7F AC03           CLR     ISIZE
01228 FDA6 B7 AC04           STA A   ISIZE+1
01229 FDA9 CE ACB6           LDX     #UNIT0
01230 FDAC FF AC70           STX     TW
01231 FDAF 86 1B             LDA A   #27
01232 FDB1 B7 AC80           STA A   FLAG2
01233 FDB4 3F      LINK2     SWI
01234 FDB5 26                FCB     38       XRIX
01235 FDB6 25 C8             BCS     LINK8
01236 FDB8 FE AC70           LDX     TW
01237 FDBB A7 00             STA A   0,X
```

```
01238 FDBD 08              INX
01239 FDBE FF AC70          STX    TW
01240 FDC1 7A AC80          DEC    FLAG2
01241 FDC4 26 EE            BNE    LINK2
01242 FDC6 7F AC07          CLR    ICNTR
01243 FDC9 BD FE2F          JSR    REDX
01244 FDCC 25 B2            BCS    LINK8
01245 FDCE FE ACB0          LDX    PPOINT
01246 FDD1 86 01            LDA A  #1
01247 FDD3 A7 00            STA A  0,X
01248 FDD5 7E 0020          JMP    EXEC
01250                *
01251                * DISK ROUTINES
01252                *
01253 FDD8 CE AA10 RESET    LDX    #DKDID
01254 FDDB 6F 01            CLR    1,X
01255 FDDD 6F 03            CLR    3,X
01256 FDDF 6F 07            CLR    7,X
01257 FDE1 6F 00            CLR    X
01258 FDE3 86 FF            LDA A  #$FF
01259 FDE5 A7 02            STA A  2,X
01260 FDE7 A7 06            STA A  6,X
01261 FDE9 86 04            LDA A  #4
01262 FDEB A7 01            STA A  1,X
01263 FDED A7 07            STA A  7,X
01264 FDEF 86 2C            LDA A  #$2C
01265 FDF1 A7 03            STA A  3,X
01266 FDF3 86 80            LDA A  #$80
01267 FDF5 A7 02            STA A  2,X
01268 FDF7 6F 06            CLR    6,X           SET UNIT ZERO
01269 FDF9 86 20            LDA A  #$20
01270 FDFB A7 02            STA A  2,X           SEND IT
01271 FDFD 86 14            LDA A  #$14
01272 FDFF A7 02            STA A  2,X           CLEAR FORMAT CODE
01273 FE01 86 0C            LDA A  #$C
01274 FE03 7E FEAC          JMP    LOOP

01276 FE06 3F          C6   SWI                  ABORT PARTITION

01278 FE07 8D 26   DLOAD    BSR    REDX
01279 FE09 7E F945          JMP    CONTRL

01281 FE0C 8D 21   LOADGO   BSR    REDX
01282 FE0E 25 F6            BCS    C6
01283 FE10 8D 03   RESTR    BSR    REND
01284 FE12 7E 0020          JMP    $20
01285 FE15 FE AC0E RENO     LDX    TISZE
01286 FE18 FF AC03          STX    ISIZE
01287 FE1B B6 AC0D          LDA A  TITRK
01288 FE1E B7 AC05          STA A  ITRK
01289 FE21 B6 AC02          LDA A  IUNIT
01290 FE24 0C              CLC
01291 FE25 46              ROR A
01292 FE26 46              ROR A
01293 FE27 46              ROR A
01294 FE28 B7 AC06          STA A  ISCTR
01295 FE2B 7F AC07          CLR    ICNTR
01296 FE2E 39              RTS

01298                *
01299                * THIS IS THE LOAD PGM ENTRY
01300                *

01302 FE2F 86 81   REDX     LDA A  #$81
01303 FE31 B7 AC68          STA A  FLAG
```

```
01304 FE34 7E F771            JMP     LOAD3

01306                  *
01307                  * THIS IS A GET A BYTE FROM DISK
01308                  *

01310 FE37 7D AC07 RIX  TST     ICNTR
01311 FE3A 26 3B        BNE     RI9

01313 FE3C CE AC05 RI5  LDX     #ITRK
01314 FE3F 8D 57        BSR     INCDA
01315 FE41 FE AC03      LDX     ISIZE
01316 FE44 09           DEX
01317 FE45 26 05        BNE     RI3
01318 FE47 86 31        LDA A   #'1          END OF FILE DURN READ
01319 FE49 7E FED2 RI2  JMP     CHK1

01321 FE4C FF AC03 RI3  STX     ISIZE
01322 FE4F B6 AC06      LDA A   ISCTR
01323 FE52 F6 AC05      LDA B   ITRK
01324 FE55 BD FEE9      JSR     XUS          NOTE CHK IS PART OF XUS
01325 FE58 86 05        LDA A   #5           NUMBER OF TRYS
01326 FE5A B7 AC6B      STA A   TEMP
01327 FE5D 86 02   RI6  LDA A   #2
01328 FE5F 8D 4B        BSR     LOOP
01329 FE61 2A 05        BPL     RI4
01330 FE63 BD FECA      JSR     RFLAG
01331 FE66 20 D4        BRA     RI5
01332 FE68 85 08   RI4  BIT A   #8
01333 FE6A 27 0B        BEQ     RI9
01334 FE6C 8D 5C        BSR     RFLAG
01335 FE6E 7A AC6B      DEC     TEMP
01336 FE71 26 EA        BNE     RI6          TRY READING AGAIN
01337 FE73 86 32        LDA A   #'2
01338 FE75 20 D2        BRA     RI2

01340 FE77 7A AC07 RI9  DEC     ICNTR
01341 FE7A 86 3C   RI10 LDA A   #$3C
01342 FE7C B7 AA13      STA A   DKCOC
01343 FE7F 86 40        LDA A   #$40
01344 FE81 B7 AA12      STA A   DKCOD
01345 FE84 B6 AA10      LDA A   DKDID
01346 FE87 36           PSH A
01347 FE88 86 2C        LDA A   #$2C
01348 FE8A B7 AA13      STA A   DKCOC
01349 FE8D 86 40        LDA A   #$40
01350 FE8F B7 AA12      STA A   DKCOD
01351 FE92 7F AA12      CLR     DKCOD
01352 FE95 32           PUL A
01353 FE96 0C           CLC
01354 FE97 39           RTS

01356                  *
01357                  * COMMON ACCUESS SUB-ROUTINES
01358                  *

01360 FE98 6C 01   INCDA INC    1,X
01361 FE9A A6 01         LDA A  1,X
01362 FE9C 84 1F         AND A  #$1F
01363 FE9E 81 1B         CMP A  #27
01364 FEA0 27 01         BEQ    INCDB
01365 FEA2 39            RTS

01367 FEA3 A6 01   INCDB LDA A  1,X
01368 FEA5 84 C1         AND A  #$C1
```

```
01369 FEA7 A7 01              STA A    1,X
01370 FEA9 6C 00              INC      X
01371 FEAB 39                 RTS

01373                *
01374                * THIS IS THE COMMAND OUT LOOP
01375                *

01377 FEAC 37        LOOP     PSH B
01378 FEAD 7D AA10            TST      DKDID
01379 FEB0 B7 AA12            STA A    DKCOD
01380 FEB3 4F                 CLR A
01381 FEB4 5F                 CLR B
01382 FEB5 7D AA11 LOOP1      TST      DKDIC
01383 FEB8 2B 0B              BMI      LOOP1A
01384 FEBA 4A                 DEC A
01385 FEBB 26 F8              BNE      LOOP1
01386 FEBD 5A                 DEC B
01387 FEBE 26 F5              BNE      LOOP1
01388 FEC0 33                 PUL B
01389 FEC1 86 35              LDA A    #'5
01390 FEC3 20 0D              BRA      CHK1
01391 FEC5 B6 AA10 LOOP1A LDA A        DKDID
01392 FEC8 33                 PUL B
01393 FEC9 39        LOOP2    RTS

01395                *
01396                * THIS IS THE RESET FLAG
01397                *

01399 FECA 86 0A     RFLAG    LDA A    #$A
01400 FECC B7 AA12            STA A    DKCOD
01401 FECF 39                 RTS

01403 FED0 86 34     CHK2     LDA A    #'4
01404 FED2 BD F802   CHK1     JSR      OUTCH
01405 FED5 FE ACB0            LDX      PPOINT
01406 FED8 6D 00              TST      0,X
01407 FEDA 2B 03              BMI      CHK3
01408 FEDC 7E F945            JMP      CONTRL
01409 FEDF 0D        CHK3     SEC
01410 FEE0 39                 RTS
01412                *
01413                * SEND ROUTINE (XUS)
01414                *

01416 FEE1 ACB6      XUSTBL   FDB      UNIT0
01417 FEE3 ACD1               FDB      UNIT1
01418 FEE5 ACEC               FDB      UNIT2
01419 FEE7 AD07               FDB      UNIT3
01420 FEE9 7F AC07   XUS      CLR      ICNTR
01421 FEEC CE FEE1            LDX      #XUSTBL
01422 FEEF 37                 PSH B              SAVE TRACK
01423 FEF0 36                 PSH A              SAVE UNIT/SECTOR
01424 FEF1 47                 ASR A
01425 FEF2 47                 ASR A
01426 FEF3 47                 ASR A
01427 FEF4 47                 ASR A
01428 FEF5 47                 ASR A
01429 FEF6 84 06              AND A    #$6       ONLY UNIT*2
01430 FEF8 27 04              BEQ      XUS1
01431 FEFA 08        XUS0     INX
01432 FEFB 4A                 DEC A
01433 FEFC 26 FC              BNE      XUS0
```

```
01434 FEFE EE 00    XUS1  LDX    0,X         GET TABLE ADDRESS
01435 FF00 17             TBA                MOVE TRACK TO A
01436 FF01 27 02          BEQ    *+4         SKIP DENSITY LOAD TRACK ZERO
01437 FF03 A6 00          LDA A  0,X         GET DENSITY
01438 FF05 B7 AC7F        STA A  FLAG1       SAVE IT
01439 FF08 B7 AA16        STA A  DKDOD       TELL DISK UNIT
01440 FF0B 26 05          BNE    XUS5
01441 FF0D 86 80          LDA A  #128
01442 FF0F B7 AC07        STA A  ICNTR
01443 FF12 86 14    XUS5  LDA A  #$14
01444 FF14 B7 AA12        STA A  DKCOD       SET IT IN FORMAT REG
01445 FF17 32             PUL A              GET SECTOR
01446 FF18 36             PSH A              SAVE FOR LATER
01447 FF19 84 1F          AND A  #$1F        SECTOR ONLY
01448 FF1B 08     XUS2    INX
01449 FF1C 4A             DEC A
01450 FF1D 26 FC          BNE    XUS2
01451 FF1F A6 00          LDA A  0,X         GET REPLACMENT SECTOR
01452 FF21 33             PUL B
01453 FF22 C4 E0          AND B  #$E0
01454 FF24 1B             ABA
01455 FF25 33             PUL B              RESTORE TRACK
01456 FF26 B7 AA16        STA A  DKDOD
01457 FF29 86 20          LDA A  #$20
01458 FF2B B7 AA12        STA A  DKCOD
01459 FF2E 17             TBA                MOVE TRACK TO A
01460 FF2F 4D     SEEK    TST A
01461 FF30 26 0C          BNE    SEEK1
01462 FF32 86 80          LDA A  #128
01463 FF34 B7 AC07        STA A  ICNTR
01464 FF37 86 0C          LDA A  #$C
01465 FF39 7F AC7F        CLR    FLAG1
01466 FF3C 20 0A          BRA    SEEK2
01467 FF3E B7 AA16 SEEK1  STA A  DKDOD
01468 FF41 86 10          LDA A  #$10
01469 FF43 B7 AA12        STA A  DKCOD
01470 FF46 86 08          LDA A  #8
01471 FF48 FE ACB0 SEEK2  LDX    FPOINT
01472 FF4B EE 03          LDX    3,X         RESTORE X
01473 FF4D 7E FEAC        JMP    LOOP
01475                *
01476                * POINTERS (VECTORS)
01477                *

01479 FFF8                ORG    $FFF8
01480 FFF8 FC6C           FDB    IRQSVC
01481 FFFA F666           FDB    SWISVC
01482 FFFC FC91           FDB    NMISVC
01483 FFFE F8D7           FDB    POWER
01484                     END
PASS   0000
OFILE  AC00
OUNIT  AC01
IUNIT  AC02
ISIZE  AC03
ITRK   AC05
ISCTR  AC06
ICNTR  AC07
OSIZE  AC08
OTRK   AC0A
OSCTR  AC0B
OCNTR  AC0C
TITRK  AC0D
TISZE  AC0E
EXEC   0020
```

| | |
|---|---|
| UPDAT | 0023 |
| ASP | AC2F |
| IONP | AC34 |
| CCNP | AC36 |
| BRNP | AC37 |
| ARNP | AC38 |
| XRNP | AC39 |
| PCNP | AC3B |
| TTYS | AB80 |
| DKDID | AA10 |
| DKDIC | AA11 |
| DKCOD | AA12 |
| DKCOC | AA13 |
| DKDOD | AA16 |
| DKDOC | AA17 |
| STACK | AC60 |
| GOPC | AC66 |
| FLAG | AC68 |
| CKSM | AC69 |
| BYTECT | AC6A |
| TEMP | AC6B |
| BEGA | AC6C |
| ENDA | AC6E |
| XHI | AC70 |
| XLOW | AC71 |
| SP | AC72 |
| TW | AC70 |
| ISOFTP | AC74 |
| DAYLIM | AC76 |
| KSEC | AC77 |
| KMIN | AC78 |
| KHR | AC79 |
| KDAY | AC7A |
| KMO | AC7B |
| KYEAR | AC7C |
| SECF | AC7D |
| XSEC | AC7E |
| FLAG1 | AC7F |
| FLAG2 | AC80 |
| PPNTF | AC81 |
| PPNTL | AC9D |
| PHASE | AC9D |
| FLAG3 | AC9E |
| PGMFLG | ACA0 |
| PHASEP | ACA6 |
| SPEND | ACAF |
| PPOINT | ACB0 |
| XSWIPR | ACB2 |
| XNMIPR | ACB4 |
| UNIT0 | ACB6 |
| UNIT0A | ACB7 |
| UNIT1 | ACD1 |
| UNIT1A | ACD2 |
| UNIT2 | ACEC |
| UNIT2A | ACED |
| UNIT3 | AD07 |
| UNIT3A | AD08 |
| ENDSPR | AD22 |
| CCRLF | 0012 |
| COUCH | 0011 |
| CINCH | 0010 |
| CINNE | 000F |
| CPDATA | 0013 |
| CPDAT1 | 0014 |
| CDUMP | 0017 |

```
START1  F600
CHEXX   F603
XINNE   F606
XINPUT  F609
XOUTCH  F60C
XCRLF   F60F
XPDATA  F612
XPDAT1  F615
XISTAT  F618
XMODE   F61B
XDUMP2  F61E
XTIME   F621
XCRIS   F624
XIS     F627
XCALDA  F62A
XOUT2H  F62D
XOT4HS  F630
XOT2HS  F633
XOUTSP  F636
XRESET  F639
XFDOS   F63C
XUPDAT  F63F
XDLOAD  F642
XLOADG  F645
XSETIO  F648
XRIX    F64B
XINCDA  F64E
XXUS    F651
XSEEK   F654
XLOOP   F657
XRFLAG  F65A
XWRT    F65D
XREND   F660
XRI10   F663
SWISVC  F666
SWISVX  F66B
SWISV5  F680
SWISV4  F683
SWISV7  F689
SWISV6  F6A0
SWISV3  F6A8
SWISV8  F6BA
MSG1    F6C2
MSG2    F6C5
MSG3    F6C5
MSG4    F6CA
MSG5    F6CE
MSG6    F6D2
MSG7    F6D8
MSG8    F6E0
MSG9    F6EB
MSG10   F6F4
MSG11   F70F
MSG12   F711
MSG13   F716
MSG14   F71B
MSG15   F720
JAN     F724
MSG16   F72D
MSG17   F736
MSG18   F73B
MSG19   F741
MSG20   F741
PRNTS2  F747
LOAD    F768
```

| | |
|---|---|
| LOAD3 | F771 |
| LOAD11 | F797 |
| LOAD15 | F7AB |
| LOAD21 | F7B2 |
| FROMTO | F7B7 |
| BADDA | F7CA |
| LOAD22 | F7DB |
| C1 | F7DB |
| BADDA1 | F7DB |
| BYTE | F7DC |
| C1A | F7F2 |
| OUTHL | F7F4 |
| OUTHR | F7F8 |
| OUTCH | F802 |
| INHEX | F805 |
| CHEX | F808 |
| CHEX1 | F818 |
| CHEX2 | F81B |
| CHANGE | F81C |
| CHA51 | F824 |
| OUT2H | F84A |
| OUT4HS | F853 |
| OUT2HS | F855 |
| OUTSP | F857 |
| C2 | F85B |
| PUNCH | F85D |
| PUN11 | F871 |
| PUN22 | F883 |
| PUN23 | F885 |
| PUN32 | F8A5 |
| C2A | F8C6 |
| LEADR | F8C8 |
| LEAD1 | F8CB |
| PUNT2 | F8D2 |
| POWER | F8D7 |
| POWER1 | F93C |
| CONTRL | F945 |
| PRNTS | F9AE |
| INEEE | F9B2 |
| INEEE1 | F9BB |
| INEEE2 | F9BD |
| OUTEEE | F9C9 |
| SFE | F9CC |
| SFE0 | F9E0 |
| SFE1 | F9E7 |
| SFE2 | F9EC |
| PRNTS1 | F9EF |
| PPARTS | F9F2 |
| PPART1 | FA00 |
| C3 | FA31 |
| DISPLA | FA34 |
| DISP1 | FA3D |
| DISP2 | FA4D |
| DISP3 | FA64 |
| DISP10 | FA68 |
| DISP4 | FA6C |
| DISP6 | FA76 |
| DISP8 | FA80 |
| DISP7 | FA8D |
| CONTPN | FA91 |
| HALTPN | FA9C |
| C41 | FAAC |
| HALTP1 | FAAE |
| C42 | FAB6 |
| GETPN | FAB8 |

| | |
|---|---|
| GETPN9 | FADC |
| BEGAN | FADD |
| BEGAN1 | FAE5 |
| BEGAN2 | FAED |
| BEGAN3 | FB25 |
| C4 | FB2F |
| GOGO | FB32 |
| CTIME | FB3E |
| CTIME1 | FB80 |
| PTIME | FB83 |
| PTIME1 | FB87 |
| CRLFIS | FBB6 |
| IS | FBB8 |
| IS1 | FBB9 |
| IS2 | FBCF |
| IS3 | FBD3 |
| IS4 | FBDC |
| IS5 | FBE0 |
| XNNOEC | FBE2 |
| INNOE0 | FBE7 |
| INNOE1 | FBEC |
| XNPUT | FBF0 |
| XUTPUT | FBF2 |
| OUTP97 | FC02 |
| OUT98B | FC0C |
| OUT98C | FC19 |
| OUT98D | FC20 |
| OUTP98 | FC21 |
| OUTP99 | FC23 |
| OUT99A | FC24 |
| OUT99B | FC2A |
| XRLF | FC2E |
| PDATA | FC32 |
| PDATA1 | FC34 |
| XTATUS | FC40 |
| STATU1 | FC45 |
| STATU2 | FC47 |
| XODE | FC4D |
| XUMP2 | FC56 |
| SETIO | FC60 |
| IRQSVC | FC6C |
| IRQSV2 | FC7E |
| IRQSV1 | FC88 |
| NMISVC | FC91 |
| NMISVX | FC96 |
| NMISV1 | FCA5 |
| PIDLE0 | FCAF |
| PIDLE | FCB4 |
| PIDLE3 | FCC7 |
| PIDLE4 | FCD1 |
| I20MSK | FCD4 |
| PHASE0 | FCE3 |
| PHASE1 | FCE6 |
| PHASE2 | FCEB |
| TIME | FCEF |
| CALDAY | FD15 |
| CALLD | FD15 |
| DATEE | FD1B |
| TIMEE | FD1E |
| DATE1 | FD21 |
| DATE2 | FD28 |
| ADDTST | FD49 |
| ADDTS1 | FD55 |
| LEAPY | FD59 |

```
LEAP1    FD5C
LEAP2    FD6C
LEAP3    FD70
LINK     FD74
LINK8    FD80
LINKO    FD85
LINK9    FD8D
LINK1    FD95
LINK2    FDB4
RESET    FDD8
C6       FE06
DLOAD    FE07
LOADGO   FE0C
RESTR    FE10
REND     FE15
REDX     FE2F
RIX      FE37
RI5      FE3C
RI2      FE49
RI3      FE4C
RI6      FE5D
RI4      FE68
RI9      FE77
RI10     FE7A
INCDA    FE98
INCDB    FEA3
LOOP     FEAC
LOOP1    FEB5
LOOP1A   FEC5
LOOP2    FEC9
RFLAG    FECA
CHK2     FED0
CHK1     FED2
CHK3     FEDF
XUSTBL   FEE1
XUS      FEE9
XUS0     FEFA
XUS1     FEFE
XUS5     FF12
XUS2     FF1B
SEEK     FF2F
SEEK1    FF3E
SEEK2    FF48

TOTAL ERRORS 00000
```

What is claimed is:

1. A stored program controlled microprocessor controller includes a microprocessor with means to operate said microprocessor in a time sharing mode to simultaneously service a centrally program controlled PBX and a data processing system, said controller having a first memory dedicated to storing the program for controlling PBX operation, said PBX including a plurality of trunk ports, each of which has means to connect to an incoming trunk, and a plurality of line ports, each of which has means to connect to a telephone extension; thedata processing system having a plurality of data ports for accessing the microprocessor to input, process and output data and programming information unrelated to the operation of said PBX, said controller having an additional memory means, means to partition said additional memory means and assign at least one of said partitions to each of said data ports, each data port thereby having access to no partition other than its assigned partition, and means to allocate and prioritize the processing time of said microprocessor between said PBX and said data processing system.

2. The device of claim 1 wherein said microprocessor and its associated structure are mounted on printed circuit boards, said boards being suitable for sheld mounting.

3. A stored program controlled microprocessor controller includes a microprocessor with means to operate said microprocessor in a time sharing mode to simultaneously service a telephone system and a data processing system, said telephone system including a plurality of trunk ports and a plurality of line ports, said microprocessor having means to control the switching and processing of telephone communications between said trunk ports and said line ports, said data processing system including at least six data ports having means to access said microprocessor and actively interact therewith to thereby utilize the data processing capability of said microprocessor to input, process, and output data and programming information unrelated to the operation of said telephone system, said microprocessor having means to service said data ports in a time sharing mode including means to allocate the processing time of said microprocessor between the telephone system and the data processing system and means to prioritize the processing time to ensure reliable telephone system operation, thereby providing means for each of six external users to actively interact with said microprocessor to input, process, and output data and programming information unrelated to the operation of said telephone system.

4. The device of claim 3 wherein the means to allocate includes means to define a series of recurring time slots, wherein said means to allocate assigns itself to a first one of said time slots, and means to assign the telephone system to a second one of said time slots, said first and second time slots being dedicated to said means to allocate and said telephone system, respectively.

5. The device of claim 4 wherein said means to allocate includes means to assign an external user and his associated data port to any one of said series of time slots not previously assigned.

6. The device of claim 5 wherein said data processing system includes at least six of said data ports and said series of time slots includes at least six time slots, any one of which is available for assignment to an external user and data port.

7. The device of claim 5 wherein the means to allocate includes means to abort the time slot of processing time assigned to an external user when his associated data port is either inputting or outputting data.

8. The device of claim 7 wherein the controller further comprises a first memory means, said means to allocate being stored therein, and a second memory means, said means to allocate having means to assign an individual partition of said second memory means to each of said data ports, each of said ports thereby having access to only its assigned partition and none other.

9. The device of claim 8 further comprising a command terminal, said command terminal including an input/output data port with means to access said first memory means, and all partitions of said second memory means.

10. The device of claim 8 wherein said command terminal has means to terminate a data port's access to said microprocessor.

11. A stored program controlled microprocessor controller includes a microprocessor with means to operate said microprocessor in a time sharing mode to simultaneously service a telephone system and a data processing system, said telephone system including a plurality of trunk ports and a plurality of line ports, said microprocessor having means to control the switching and processing of telephone communications between said trunk ports and said line ports, said data processing system including at least one data port having means to access said microprocessor and actively interact therewith to thereby utilize the data processing capability of said microprocessor to input, process, and output data and programming information unrelated to the operation of said telephone system, said microprocessor including a PROM memory means and a RAM memory means, with an address bus and a data bus interconnecting said microprocessor and said PROM means and RAM means, a first buffer terminating said address bus, a second buffer terminating said data bus, said buffers thereby conditioning and stabilizing data and address information sent and received by said microprocessor, a first means to selectively inhibit said first buffer and a second means to selectively inhibit said second buffer to selectively block the flow of information through said buffers.

12. The device of claim 11 further comprising an address decoding means to enable said microprocessor to address a specific partition of memory with a number of address bits smaller than the number of bits required to individually address all memory means.

13. The device of claim 11 further comprising a command terminal data port connected to said address bus and data bus for accessing the microprocessor and all of said memory means, and interface circuitry to condition data from either a TTY, TTL or RS232 input/output device.

14. The device of claim 11 further comprising means to add a plurality of additional memory means addressable by said microprocessor.

15. The device of claim 11 further comprising at least one additional memory means, said additional memory means having an address buffer and a data buffer, means interconnecting the address and data buffers associated with each of the microprocessor and the additional memory means so that said microprocessor may selectively access said additional memory means, a first means to selectively inhibit said memory address buffer, and a second means to selectively inhibit said memory means data buffer so that address and data information is permitted to flow only when said additional memory means is accessed.

16. The device of claim 15 further comprising address decoding means connected to said address bus to selectively produce a control signal for operating said first and second inhibit means.

17. The device of claim 14 wherein said additional memory means includes a plurality of data ports, means interconnecting each of said data ports with an address buffer and a data buffer associated with the microprocessor so that information may flow between them, each port having means to convert data from serial format to parallel format and parallel format to serial format, and each port having interface circuitry to condition data received from or transmitted to an input/output device.

18. The device of claim 17 wherein each data port further includes a data port data buffer, said interconnecting means being connected to said data port data buffer, means to selectively inhibit said data port data buffer; said device further comprising data port address decoding means to selectively produce a control signal for said data ports and said inhibit means so that data information is permitted to flow only when said data port is accessed.

19. The device of claim 14 further comprising a disc type memory, and a data port and interface circuitry to interconnect said disc memory to said microprocessor.

20. The device of claim 19 wherein said disc memory includes a disc memory data buffer to condition and stabilize the data transmitted and received by said disc memory, and further comprising means interconnecting said disc memory data buffer and the microprocessor data buffer, means to selectively inhibit said disc memory data buffer, and address decoding means to selectively produce a control signal for said data port and said inhibit means.

21. The device of claim 14 further comprising interface circuitry between said microprocessor and said telephone system, said interface circuitry including a data latch and an address latch to stabilize the data and address information to be written into said telephone system, said telephone system having a data bus, a data buffer to isolate the telephone data bus from the microprocessor data bus, a partition of memory addresses being assigned to said telephone system, address decoding means including a signal conditioning means to produce a control signal for said telephone partition of memory, said signal conditioning means also producing a read/write strobe signal for said telephone partition of memory, and means to sense the non-occurrence of a write signal for a predetermined time period and cause a reset signal to be generated.

22. The device of claim 1 further comprising a command terminal, said command terminal having means to access all partitions of said additional memory means and said first memory through said microprocessor to thereby be capable of supervising both the data processing system and the PBX.

23. The device of claim 1 further comprising means to allocate processing time to each of the data ports including means to selectively abort the processing time of any data port.

24. A stored program controlled microprocessor controller comprising a plurality of printed circuit boards, each of said boards being substantially the same size, a first of said boards having mounted thereon a microprocessor, a read/write bus interconnecting said microprocessor with said other circuit boards, an associated timing circuit, a plurality of memory means, a data port, a baud rate generator, a common bus network including an address bus and a data bus between said microprocessor and said memory means and said data port, buffer means terminating said common bus network with means to selectively inhibit information flow through said buffer means, and address decoding means; a second of said boards having mounted thereon a plurality of PROM memory means, a second common bus network including a second address bus and a second data bus interconnecting said PROM memory means, a second address decoding means to produce an enable signal when said second board is addressed, and a second buffer means terminating said second common bus network with means to selectively inhibit information flow through at least said second data bus; a third of said boards having mounted thereon a plurality of RAM memory means, a third common bus network including a third address bus and a third data bus interconnecting said RAM memory means, a third address decoding means to produce an enable signal when said third board is addressed, a write enable circuit to produce a write enable signal to said RAM memory means when said third board is addressed and said microprocessor produces a write signal on its read/write bus, a read enable circuit to produce a read enable signal to said RAM memory means when said third board is addressed and said microprocessor does not produce a write signal on its read/write bus, and a third buffer means terminating said third common bus network including means to selectively inhibit information flow through at least said third data bus; a fourth of said boards having mounted thereon a plurality of bi-directional data ports, each of said ports having means to convert data from serial format to parallel format and parallel format to serial format, a baud rate generator having a plurality of outputs with an option strap to selectively connect one of said baud rate generator outputs to each of said data ports, a fourth address decoding means to produce an enable signal when said fourth board is addressed, a read/write enable circuit which produces a read or write enable signal when said fourth board is addressed and said microprocessor produces either a read or write signal on its read/write bus, a fourth common bus network including a fourth address bus and a fourth data bus interconnecting said data ports, a fourth buffer means terminating said fourth common bus network including means to selectively inhibit at least the fourth data bus, and means to produce an interrupt request when any of said data ports is operative; and a fifth of said boards having mounted thereon at least two bi-directional data ports, said ports having means to control and access a disc memory, means to drive relays corresponding to an operator hook switch, and means to drive relays corresponding to unattended night bell alarms, a fifth common bus network including a fifth address bus and a fifth data bus interconnecting said data ports, a fifth buffer means terminating at least said fifth data bus with means to selectively inhibit said fifth data bus, a fifth address decoding means to produce an enable signal when said fifth board is addressed, means to produce an interrupt request when one of said ports is operative and means operatively interconnecting all of said buffer means.

25. The device of claim 24 further comprising a sixth board having mounted thereon an address latch to stabilize address information transmitted to said sixth board, a sixth address decoding means to produce a control signal for addressing a first preselected portion of addressable equipment, a data latch to stabilize data information transmitted to or from said sixth board, means to selectively inhibit said address latch and data latch, a sixth buffer means, means to selectively inhibit said sixth buffer means, a seventh address decoding means to produce a control signal for addressing a second preselected portion of addressable equipment, a master select circuit and a master read/write circuit, said master read/write circuit conditioning the read/write signal from said microprocessor to enhance its further transmission, said master select circuit producing a strobe pulse for each read or write signal produced by said master read/write circuit, a protective circuit, said protective circuit having means to sense the absence of a write signal on the microprocessor read/write bus for a preselected time period and means to produce a master reset signal in response thereto, and means to initialize the address latch and data latch.

* * * * *